(12) United States Patent
Nakagawa et al.

(10) Patent No.: US 6,569,673 B1
(45) Date of Patent: May 27, 2003

(54) GARBAGE DISPOSING DEVICE

(75) Inventors: Takaharu Nakagawa, Hirakata (JP); Manabu Mizobuchi, Kobe (JP); Toshiharu Sako, Suita (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/582,643

(22) PCT Filed: Jan. 30, 1998

(86) PCT No.: PCT/JP98/00382
§ 371 (c)(1),
(2), (4) Date: Jul. 28, 2000

(87) PCT Pub. No.: WO99/38624
PCT Pub. Date: Aug. 5, 1999

(51) Int. Cl.[7] .................................................. B09B 3/00
(52) U.S. Cl. ................... 435/286.6; 435/286.7; 435/290.1; 435/300.1; 435/266
(58) Field of Search .......................... 435/266, 286.6, 435/286.7, 289.1, 290.1, 290.2, 300.1; 422/4, 5, 178; 96/146

(56) References Cited

U.S. PATENT DOCUMENTS

| | | | |
|---|---|---|---|
| 4,038,050 A | * 7/1977 | Lowther | ........................... 95/1 |
| 4,402,717 A | * 9/1983 | Izumo et al. | .................. 96/118 |
| 5,496,730 A | * 3/1996 | Teramachi | ................ 435/290.2 |
| 6,037,169 A | * 3/2000 | Sako et al. | .................. 422/170 |

FOREIGN PATENT DOCUMENTS

| | | | |
|---|---|---|---|
| JP | 60-019490 A | * | 1/1985 |
| JP | 8253384 | | 10/1996 |
| JP | 08-309319 A | * | 11/1996 |
| JP | 9239347 | | 9/1997 |
| JP | 9239348 | | 9/1997 |
| JP | 10043726 | | 2/1998 |

* cited by examiner

Primary Examiner—William H. Beisner
(74) Attorney, Agent, or Firm—Rader, Fishman & Grauer PLLC

(57) ABSTRACT

A garbage disposing device includes a treatment chamber used to decompose food wastes by a microorganism, intake passage, exhaust passage, and a return path extending from a diverging portion in the exhaust passage to the treatment chamber. An exhaust airflow adjuster is provided at the diverging portion. A control unit controls the exhaust airflow adjuster such that after water and ammonia in an air exhausted from said treatment chamber are adsorbed by a dehumidifier provided in the exhaust passage, a part of the air is returned to the treatment chamber through the return path, and the remaining air is exhausted to the outside through a deodorizer. As a result, a small deodorizer is available, and the garbage disposing device can be small-sized as a whole. In addition, it is possible to save energy used for the decomposing treatment of the food wastes. In a regenerating operation for removing the adsorbed water and ammonia from the dehumidifier, the control unit controls the exhaust airflow adjuster such that the return path is closed at the diverging portion.

15 Claims, 16 Drawing Sheets

GARBAGE DISPOSING DEVICE

BACKGROUND OF THE INVENTION

1. Field of the Invention

The present invention relates to a garbage disposing device for decomposing organic wastes such as food wastes by a microorganism, and particularly the garbage disposing device capable of efficiently performing the decomposing treatment with reduced energy without using a large-scale deodorizer for deodorizing an air containing unpleasant odor caused by the decomposition.

2. Disclosure of the Prior Art

In the past, devices for decomposing organic wastes containing water such as food wastes by a microorganism have been known. In the devices, a gas generated by the decomposition of the food wastes is exhausted from a treatment chamber. When a water vapor amount in the exhaust gas exceeds a saturated water vapor amount, dewdrops occur. To efficiently perform the decomposing treatment, a large-scale exhausting unit having a high exhausting capability is needed. In addition, since unpleasant odor is generated during the decomposing treatment, it is necessary to use a deodorizer for removing the unpleasant odor.

However, to remove a large amount of the unpleasant odor contained in the exhaust gas supplied from the large-scale exhausting unit, a purifying device having a high purifying capability will be required. For example, when an adsorbent is used for the purifying device, there is a problem that the adsorbent must be exchanged or regenerated frequently. On the other hand, when a microorganism deodorizer or the like is used for the purifying device, a large deodorizing vessel would be needed. As a result, there is a problem that the garbage disposing device is large-scaled as a whole. In addition, when a catalyst is used for the purifying device, it is not necessary to frequently exchange the adsorbent. However, the disposing device is large-scaled as a whole, so that a large amount of energy is consumed to heat the air. Additionally, energy is required to exhaust the air. Therefore, it is desired to develop a garbage disposing system capable of performing the deodorizing treatment with reduced energy without lowering the decomposition efficiency of the food wastes by the microorganism.

For example, FIG. 16 shows a schematic diagram of a garbage disposing device disclosed in Japanese Patent Early Publication [KOKAI] No. 8-253384. This device 1F comprises a treatment chamber 10F in which food wastes 2F are decomposed by a microorganism, a heater 80F disposed at a bottom of the treatment chamber, exhaust passage 21F extending from the treatment chamber to exhaust an air containing unpleasant odor generated by the decomposition of the food wastes, a return path 22F diverged from the exhaust passage at a diverging portion 23F to connect with the treatment chamber 10F, dehumidifier 30F disposed in the return path to dehumidify an air supplied to the return path, intake passage 20F formed at upstream of the dehumidifier in the return path to take in a fresh air from the outside, fan 13F disposed at downstream of the dehumidifier, humidity sensor 62F disposed in the treatment chamber, and a control unit 3F for controlling the dehumidifier and the fan.

The air in the treatment chamber 10F is sent to the return path 22F by operating the fan 13F, and returned again to the treatment chamber after water contained in the air is removed by the dehumidifier 30F. When humidity measured by the humidity sensor 62F is high, the control unit 3F controls the fan 13F and the dehumidifier 30F to increase the dehumidifying capability. Thus, a suitable environment for the decomposing treatment of the food wastes by the microorganism can be maintained in the treatment chamber.

However, in this disposing device 1F, a sufficient countermeasure is not taken against the unpleasant odor of the air exhausted through the exhaust passage 21F to the outside. In addition, since the water vapor in the air sent to the return path 22F is removed by generating dewdrops in the dehumidifier 30F, the removed dewdrops are drained through a drainpipe 33F. In this case, there is a possibility that a water-soluble unpleasant odor component dissolves in the dewdrops, so that the removed dewdrops emit strong unpleasant odor. This will give a bad influence to the environments around the disposing device.

Thus, there is room for further improvement in the prior art system for decomposing the organic wastes such as food wastes by the microorganism.

SUMMARY OF THE INVENTION

For improving the above problems, an object of the present invention is to provide a garbage disposing device which is capable of removing unpleasant odor in a gas generated by a decomposition of food wastes by a microorganism, and efficiently decomposing the food wastes with reduced energy. That is, the garbage disposing device of the present invention includes a treatment chamber used to decompose the food wastes by the microorganism, an intake passage for supplying a fresh air into the treatment chamber from an outside, and an exhaust passage connected to an outlet of the treatment chamber at one end and having an exhaust port at the other end. A dehumidifier is provided in the exhaust passage. The dehumidifier includes a dehumidifying agent and a regenerating unit for removing water adsorbed on the dehumidifying agent to regenerate the dehumidifying agent. A return path extends from a diverging portion in the exhaust passage, which is positioned at downstream of the dehumidifier, to the treatment chamber. A ventilator is provided at upstream of the diverging portion to send the air containing the unpleasant odor generated in the treatment chamber toward the outside through the exhaust passage. A deodorizer for removing the unpleasant odor from the air to be exhausted through the exhaust port is provided between the dehumidifier and the exhaust port in the exhaust passage. An exhaust airflow adjuster is provided at the diverging portion to adjust an air amount to be returned from the exhaust passage to the treatment chamber through the return path. A control unit controls the exhaust airflow adjuster according to the following manner. When the garbage disposing device is in an ordinary use mode, the exhaust airflow adjuster is set to a first position where a part of an air supplied from the dehumidifier is exhausted through the exhaust port, and the remaining air is returned to the treatment chamber through the return path. When the garbage disposing device is in a regenerating operation mode for the dehumidifying agent, the exhaust airflow adjuster is set to a second position where the return path is closed at the diverging portion.

In the present invention, since a part of the gas exhausted from the treatment chamber is treated by the dehumidifier to remove water therefrom, and then returned to the treatment chamber through the return path so as to be used again for the decomposition of food wastes by the microorganism, it is possible to reduce an air amount exhausted to the outside through the exhaust passage. Therefore, a small deodorizer can be used in the present device. As a result, it is possible to small-size the garbage disposing device as a whole, and also save energy for operating the garbage disposing device.

It is a further object of the present invention is to provide a garbage disposing device characterized in that after the dehumidifying agent is heated to remove the adsorbed water therefrom, the dehumidifying agent can be rapidly cooled to enhance a recovery of the dehumidifier to the decomposing treatment of the food wastes. That is, after the regenerating operation for the dehumidifying agent is finished, the control unit sets the exhaust airflow adjuster to a third position where the exhaust passage is closed at the diverging portion. The dehumidifying agent can be efficiently cooled by a circulating air flowing in a closed path of the treatment chamber→the exhaust passage→the return path→the treatment chamber. Since the exhaust passage extending toward the deodorizer is closed, it is possible to send a large amount of air in the closed path by increasing an output of the ventilator. As a result, the dehumidifying agent can be quickly cooled.

It is another object of the present invention is to provide a garbage disposing device characterized in that a heat exchanger not made of a corrosion resistance material is available, and waste heat collected from the exhaust gas flowing in the exhaust passage can be used to enhance the decomposition of the food wastes by the microorganism. That is, the heat exchanger is provided between the deodorizer and the exhaust port in the exhaust passage. A fresh air passing the intake passage can be warmed by the waste heat collected from the exhaust gas flowing in the exhaust passage by the heat exchanger. The warmed fresh air is introduced into the treatment chamber to enhance the decomposition of the food wastes. By the way, a corrosive gas containing a large amount of water vapor and ammonia is usually exhausted from the treatment chamber. Since the heat exchanger is provided at, downstream of the deodorizer, the heat exchanger is not exposed to the corrosive gas. Therefore, it is not necessary to use an expensive heat exchanger using the corrosion resistance material.

These and still other objects and advantages will become apparent from the following detail description of the preferred embodiments of the invention referring to the attached drawings.

DETAIL DESCRIPTION OF THE PREFERRED EMBODIMENTS

The present invention is explained in detail according to the following preferred embodiments with the attached drawings.

First Embodiment

Figure 1:
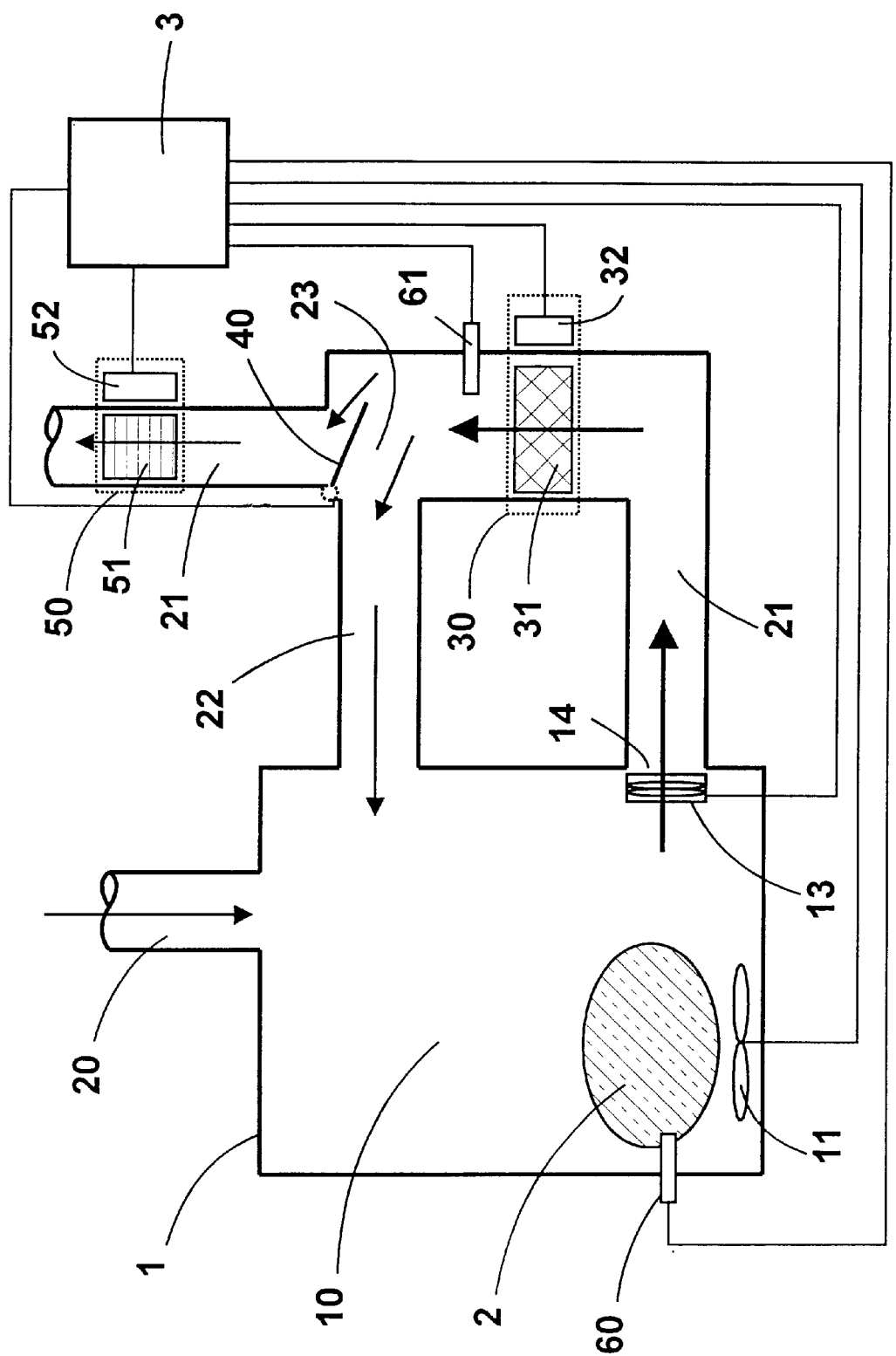
FIG. 1 is a schematic diagram showing an ordinary use mode of a garbage disposing device of a first embodiment of the present invention.

FIG. 1 shows a schematic diagram of a garbage disposing device 1 of the first embodiment of the present invention. The garbage disposing device 1 includes a treatment chamber 10 in which food wastes 2 are decomposed by a microorganism, intake passage 20 for introducing a fresh air from an outside into the treatment chamber through an inlet of the treatment chamber, exhaust passage 21 connected to an outlet 14 of the treatment chamber at one end and having an exhaust port at the other end, and a return path 22 for returning an air passing the exhaust passage to the treatment chamber.

The treatment chamber 10 has a stirring unit 11 for stirring the food wastes, water content sensor 60 for measuring the water content in the food wastes, and a fan 13 for sending an air including unpleasant odor generated by the decomposition of the food wastes in the treatment chamber to the exhaust passage 21. The stirring unit and the water content sensor can be omitted from the treatment chamber.

A dehumidifier 30 for dehumidifying the air provided from the treatment chamber 10 is disposed in the exhaust passage 21. The dehumidifier 30 includes a dehumidifying agent 31 and a heater 32 as a regenerating unit for the dehumidifying agent. The heater is used to remove water adsorbed on the dehumidifying agent. As the dehumidifying agent, for example, it is possible to use a solid acid such as silica gel, zeolite and aluminum silicate, calcium chloride, or calcium carbonate. These dehumidifying agents are capable of adsorbing ammonia of a main component of the unpleasant odor in addition to the water vapor. In particular, it is preferred to use silica gel, which efficiently removes ammonia and trimethylamine of the unpleasant odor components in addition to the water vapor. The dehumidifier using the dehumidifying agent differs from a dehumidifier applying a freezing cycle or a thermoelectric converting element, or a dehumidifier for making dewdrops from the water vapor in the air and removing the dewdrops. That is, the dehumidifier using the dehumidifying agent has an advantage that the occurrence of dewdrops including the unpleasant odor components can be prevented, so that a user does not need to dump the collected dewdrops. Thus, there is no need to worry about the unpleasant odor caused by the dewdrops.

The return path 22 extends from a diverging portion 23 of the exhaust passage 21, which is formed at downstream of the dehumidifier 30, to the treatment chamber 10. An exhaust airflow adjuster 40 for adjusting an air amount to be returned from the exhaust passage 21 to the treatment chamber 10 by the return path 22 is provided at the diverging portion 23. For example, it is possible to use an electromotive damper as the exhaust airflow adjuster.

A control unit 3 controls the exhaust airflow adjuster 40. When the garbage disposing device 1 is in an ordinary use mode, the control unit 3 sets the exhaust airflow adjuster 40 to a first position where a part of the air provided from the dehumidifier 30 is exhausted to the outside through the exhaust passage 21, and the balance of the air is returned to the treatment chamber 10 through the return path 22. An air amount introduced into the treatment chamber through the intake passage 20 is substantially equal to the air amount exhausted to the outside through the exhaust passage 21. Therefore, the first position of the exhaust airflow adjuster 40 is determined such that the air amount introduced into the treatment chamber 10 contains an amount of oxygen required to decompose the food wastes by the microorganism in the treatment chamber. By controlling this exhaust airflow adjuster 40, it is possible to considerably reduce an exhaust amount of the garbage disposing device 1. As described later, the exhaust airflow adjuster 40 can be also controlled according to an output of the water content sensor 60 disposed in the treatment chamber 10.

On the other hand, when the garbage disposing device is in a regenerating operation mode for the dehumidifying agent 31, in which the dehumidifying agent is heated to remove absorbed water and ammonia therefrom, the control unit 3 set the exhaust airflow adjuster 40 to a second position where the return path 22 is closed at the diverging portion 23. The garbage disposing device of this embodiment has a moisture sensor (not shown) for measuring a moisture amount adsorbed on silica gel and providing a first control signal to the control unit 3 when the detected moisture amount exceeds a predetermined moisture amount, and an ammonia sensor (not shown) for measuring an ammonia amount adsorbed on the silica gel and providing a second signal to the control unit when the measured ammonia amount exceeds a predetermined ammonia amount. According to either the first control signal or the second control signal, the control unit 3 starts the heater 32, and sets the exhaust airflow adjuster 40 to the second position for the regenerating operation. It is possible to use only the moisture sensor without using the ammonia sensor.

A deodorizer 50 for removing the unpleasant odor from the air passing the exhaust passage 21 is provided at downstream of the dehumidifier 30 in the exhaust passage. In this embodiment, the deodorizer 50 is provided at downstream of the diverging portion 23. Since most of the air provided from the dehumidifier 30 flows toward the return path, and the balance of the air is exhausted to the outside, it is not necessary to use a large-scaled deodorizer in the garbage disposing device of the present invention. Consequently, the garbage disposing device can be small-sized as a whole. In addition, energy required to operate the garbage disposing device can be reduced.

With respect to an odor component except for a nitrogen-containing odor component such as ammonia or trimethylamine, for example, an additional deodorizer (not shown) for deodorizing a sulfur-containing odor component such as sulfides may be provided between the dehumidifier 30 and the diverging portion 23 in the exhaust passage 21. It is particularly preferred to use activated carbon as an adsorbent of the additional deodorizer.

The deodorizer 50 used in this embodiment is composed of an oxide catalyst 51, which is an oxide such as alumina carrying a noble metal thereon, and a heater 52. However, as the deodorizer, it is possible to use an adsorbent, deodorizer applying an ozonization process, deodorizer applying a microorganism or a combination thereof. It is preferred to use platina, rhodium or palladium as the noble metal. Since the unpleasant odor components passing through the dehumidifier 30 are removed by the deodorizer, it is possible to prevent the occurrence of unpleasant odor around the garbage disposing device.

Next, an operation of the garbage disposing device 1 of the present invention is explained.

First, the ordinary use mode for decomposing the food wastes 2 by the microorganism is explained referring to FIG. 1. The control unit 3 controls the fan 13 to send the air containing the moisture and the unpleasant odor such as ammonia generated in the treatment chamber to the dehumidifier 30 at a large airflow amount. The control unit 3 sets the exhaust airflow adjuster 40 to the first position, so that a part of an air provided from the dehumidifier 30 is exhausted to the outside through the exhaust passage 21, and the balance of the air is returned to the treatment chamber 10 through the return path 22. The control unit 3 also controls the heater 52 such that the catalyst 51 of the deodorizer 50 is heated at a temperature predetermined for the ordinary use mode. The unpleasant odor components in the air to be exhausted to the outside are removed by the deodorizer. Since ammonia and trimethylamine of the unpleasant odor components can be removed by the dehumidifier 30, it is possible to lighten a burden to the deodorizer.

Figure 2:
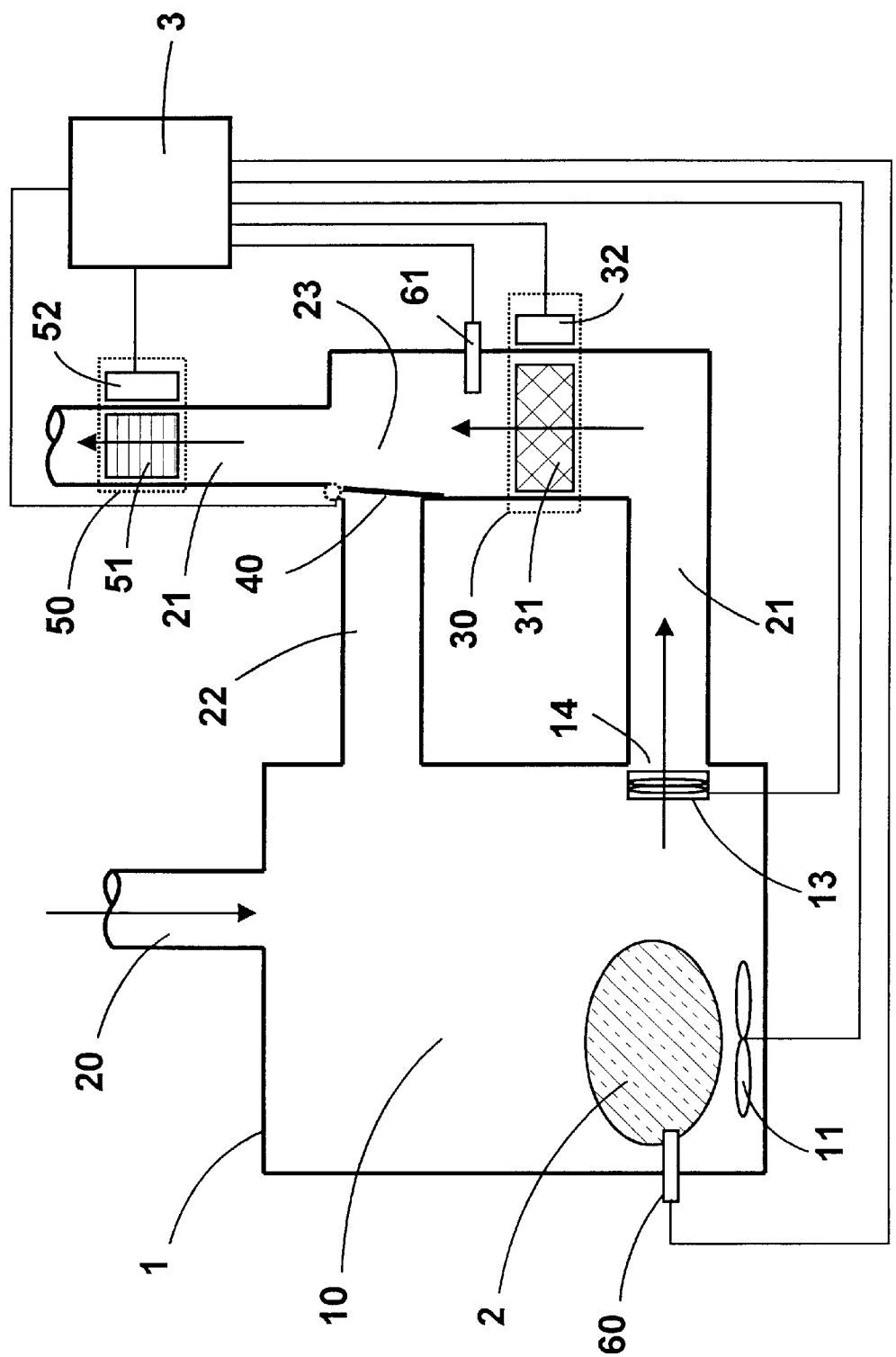
FIG. 2 is a schematic diagram showing a regenerating operation mode for a dehumidifying agent of the garbage disposing device of the first embodiment.

Next, the regenerating operation mode for the dehumidifying agent 31, in which the adsorbed moisture and ammonia are removed from the dehumidifying agent, is explained referring to FIG. 2. The control unit 3 sets the exhaust airflow adjuster 40 to the second position to substantially isolate the return path 22 from the exhaust passage 21. In addition, the control unit 3 starts a supply of electric power to the heater 32. Since the return path 22 is isolated, all of the moisture and ammonia components removed from the dehumidifying agent 31 are sent to the deodorizer 50 without being returned to the treatment chamber 10. The control unit 3 keeps the heater 52 at a high temperature to operate the deodorizer 50 at full capacity.

Since a small deodorizer is used in the garbage disposing device of this embodiment, there is a possibility that the deodorizing operation is not sufficiently performed when the large airflow amount is supplied to the deodorizer. Therefore, the control unit 3 controls the fan 13 such that the airflow amount in the regenerating operation mode is smaller than that in the ordinary use mode. At an initial stage of the regenerating operation, a high concentration of ammonia is sent from the dehumidifier to the deodorizer. Therefore, it is preferred to set the catalyst temperature of the deodorizer 50 to a maximum temperature within an acceptable temperature range. As the regenerating operation progresses, the concentration of ammonia removed from the dehumidifying agent 31 decreases. By reducing the catalyst temperature of the deodorizer 50 according to the decrease of the ammonia concentration, it is possible to save energy for the regenerating operation. Alternatively, the temperature of the heater 32 may be controlled such that ammonia removed from the dehumidifying agent 31 is maintained to a constant concentration. A humidity sensor 61 for measuring a humidity of the air provided from the dehumidifier 30 is provided in the exhaust passage 21. When the measured humidity reaches a predetermined value, the control unit 3 stops the supply of electric power to the heater 32 to finish the regenerating operation.

In a cooling operation mode, the dehumidifying agent 31 heated in the regenerating operation mode is cooled, so that the dehumidifying agent can adsorb the moisture and ammonia again. The cooling operation mode can be performed according to either a first cooling mode or a second cooling mode explained below.

In the first cooling mode, as shown in FIG. 2, the exhaust airflow adjuster 40 is set to the second position, and the airflow amount of the fan 13 for the regenerating operation mode is maintained. When the temperature of the dehumidifying agent 31 is high, the dehumidifying agent can not remove ammonia from the air provided from the treatment chamber. Therefore, it is preferred to heat the catalyst at a temperature higher than that of the ordinary use mode and lower than that of the regenerating operation mode to increase the deodorizing capability of the deodorizer 50. As the temperature of the dehumidifying agent decreases, the ammonia adsorbing capability thereof is recovered. Therefore, it is preferred to gradually reduce the catalyst temperature of the deodorizer 50 in response to the decrease of the temperature of the dehumidifying agent 31.

Figure 3:
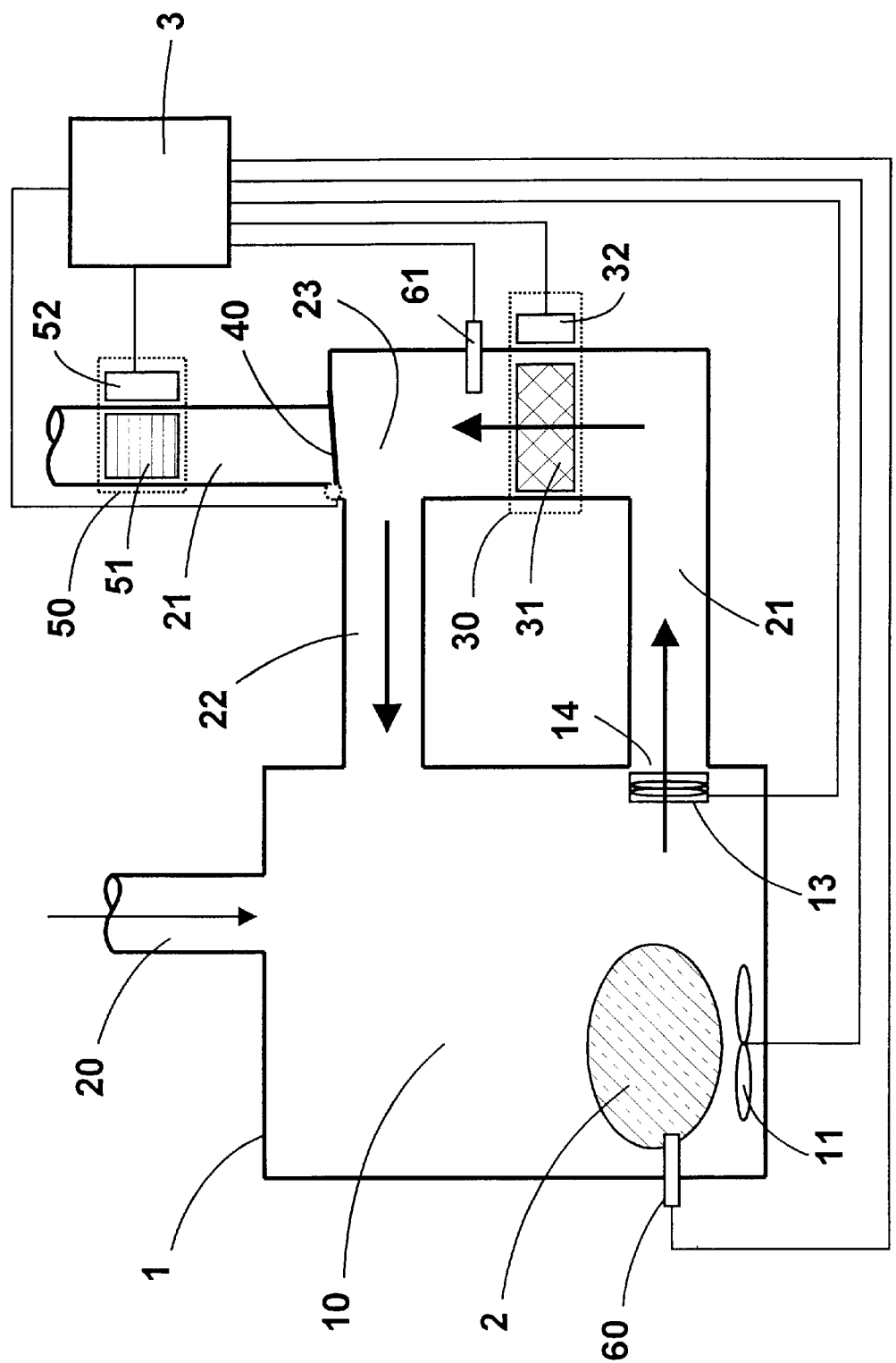
FIG. 3 is a schematic diagram showing a cooling operation mode for the dehumidifying agent of the garbage disposing device of the first embodiment.

In the second cooling mode, as shown in FIG. 3, the control unit 3 sets the exhaust airflow adjuster 40 to a third position where the exhaust passage 21 is closed at the diverging portion 23 so that all of the air passing the dehumidifier 30 is returned to the treatment chamber 10 through the return path 22. A large airflow amount of the air provided by the fan 13 circulates within a closed loop composed of the treatment chamber 10→the exhaust passage 21→(the dehumidifier 30)→the return path 22→the treatment chamber 10 to enhance the cooling operation of the dehumidifying agent. In this time, it is not necessary to heat the catalyst 51 of the deodorizer 50. This second cooling mode is effective to rapidly cool the dehumidifying agent.

In the garbage disposing device of this embodiment, there is a possibility that a large amount of odor containing ammonia occurs when he food wastes are stirred in the treatment chamber 10 by the stirring unit 11. In this case, as shown in FIG. 3, the control unit 3 sets the exhaust airflow adjuster 40 to the third position just before the stirring unit is operated, so that all of the air supplied from the dehumidifier 30 is returned to the treatment chamber 10 through the return path 22. Since the stirring unit 11 is operated under this condition, even when the concentration of odor rapidly increases in the treatment chamber, the air containing the odor continues to circulate within the closed loop, until ammonia is sufficiently adsorbed and removed by the dehumidifying agent 31.

Additionally, in this embodiment, the control unit 3 controls the fan 13 and the exhaust airflow adjuster 40 according to an output of the water content sensor 60 disposed in the treatment chamber 10. That is, when a measured water content in the food wastes exceeds a predetermined water content, the control unit 3 increases the output of the fan 13 and regulates an opening amount of the exhaust passage 21 by the exhaust airflow adjuster 40 to substantially maintain a certain air amount exhausted to the outside through the exhaust passage. In other words, the control unit 3 regulates an opening amount of the return path 22 by the exhaust airflow adjuster 40 to increase the air amount passing the return path. On the contrary, when the measured water content in the food wastes is less than the predetermined water content, the control unit 3 reduces the output of the fan 13 to prevent unusual drying of the food wastes. If necessary, a humidity sensor may be provided in the treatment chamber 10 in addition to the water content sensor. In this case, the fan 13 and exhaust airflow adjuster 40 can be controlled according to an output of the humidity sensor. In addition, a weight sensor of the food wastes may be provided in the treatment chamber. In this case, the fan 13 and exhaust airflow adjuster 40 can be controlled according to an output of the weight sensor.

Second Embodiment

Figure 4:
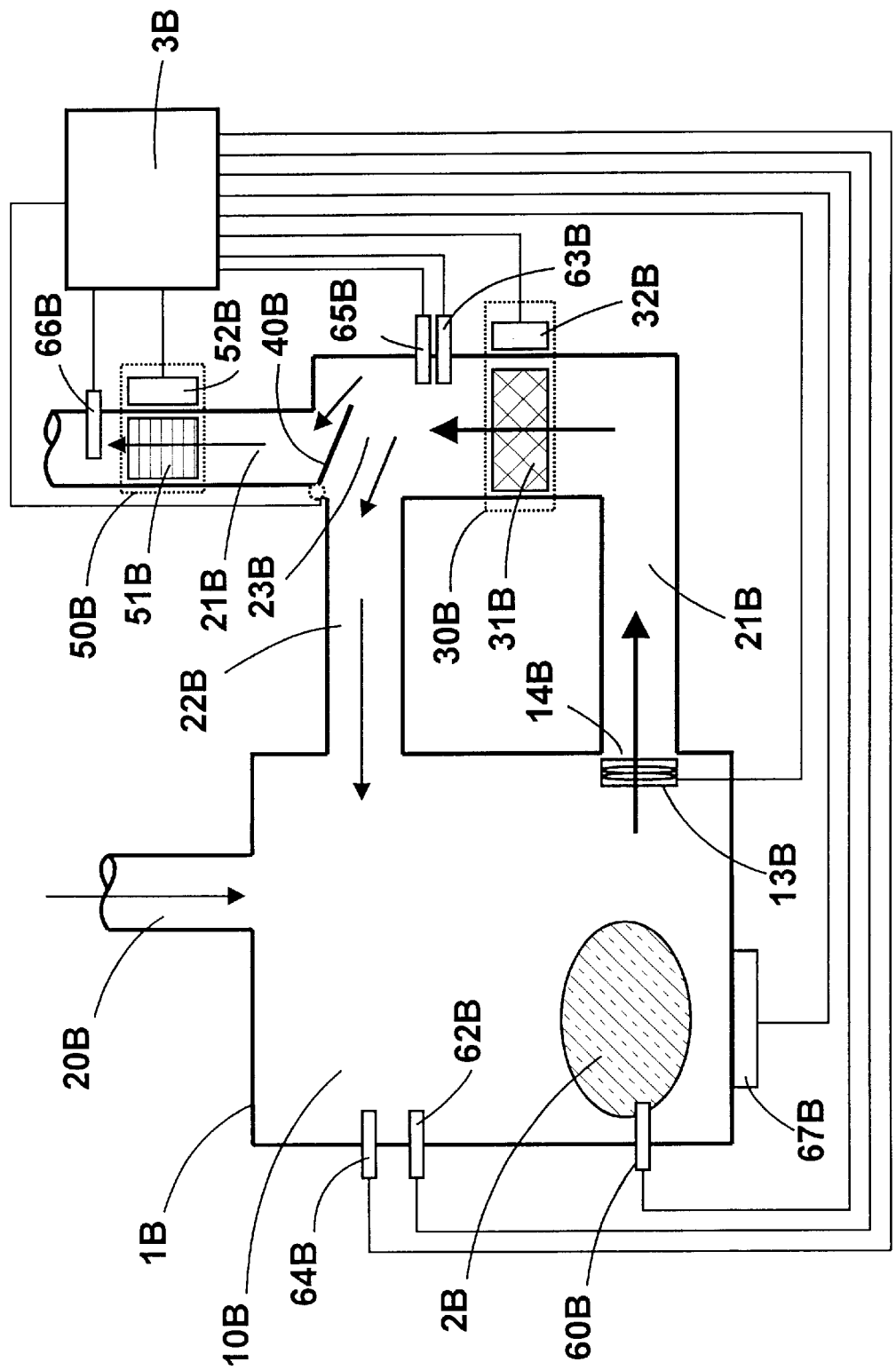
FIG. 4 is a schematic diagram of a garbage disposing device of a second embodiment of the present invention.

A schematic diagram of a garbage disposing device of the second embodiment of the present invention is shown in FIG. 4. The garbage disposing device 1B is substantially equal to that of the first embodiment except for the following features. Therefore, no duplicate explanation to common parts and operations is deemed necessary. In the drawings, like parts are designated by reference numerals with a suffixed letter of "B".

The garbage disposing device 1B of this embodiment has a timer (not shown) for providing a control signal to a control unit 3B when the total time used of a dehumidifier 30B reaches a predetermined time. According to the control signal, the control unit 3B sets an exhaust airflow adjuster 40B to a second position where a return path 22B is substantially isolated from an exhaust passage 21B, and then starts a regenerating operation for a dehumidifying agent 31B. A start time of the regenerating operation can be determined according to an amount of water or ammonia assumed from a maximum weight of food wastes in the treatment chamber, and a saturated adsorption amount of the dehumidifying agent 31B.

By the way, according to the kind of food wastes in the treatment chamber and the fermentation state of the food wastes, it is often desired to start the regenerating operation at an earlier time than the predetermined time of the timer. The timing of starting the regenerating operation for the dehumidifying agent 31B can be modified by a system explained below. This system can be applied to the garbage disposing device of the first embodiment, if necessary.

The garbage disposing device 1B has a water content sensor 60B for measuring a water content in the food wastes 2B in the treatment chamber 10B and providing a control signal to the control unit 3B when the measured water content is out of a predetermined range, a first humidity sensor 62B for measuring a humidity in the treatment chamber and providing a control signal to the control unit when the measured humidity is out of a predetermined range, and a second humidity sensor 63B for measuring a humidity of an air provided from the dehumidifier 30B and providing a control signal to the control unit 3B when the detected humidity is out of a predetermined range.

In addition, the garbage disposing device 1B has a first ammonia sensor 64B for measuring an ammonia concentration in the treatment chamber and providing a control signal to the control unit when the measured ammonia concentration is out of a predetermined range, a second ammonia sensor 65B for measuring an ammonia concentration of the air provided from the dehumidifier and providing a control signal to the control unit when the measured ammonia concentration is out of a predetermined range, a third ammonia sensor 66B for measuring an ammonia concentration of an air provided from an deodorizer 50B and providing a control signal to the control unit when the measured ammonia concentration is higher than a predetermined ammonia concentration, and a weight sensor 67B for measuring a weight of the food wastes in the treatment chamber and providing a control signal to the control unit when the measured weight is out of a predetermined range.

Figure 5:
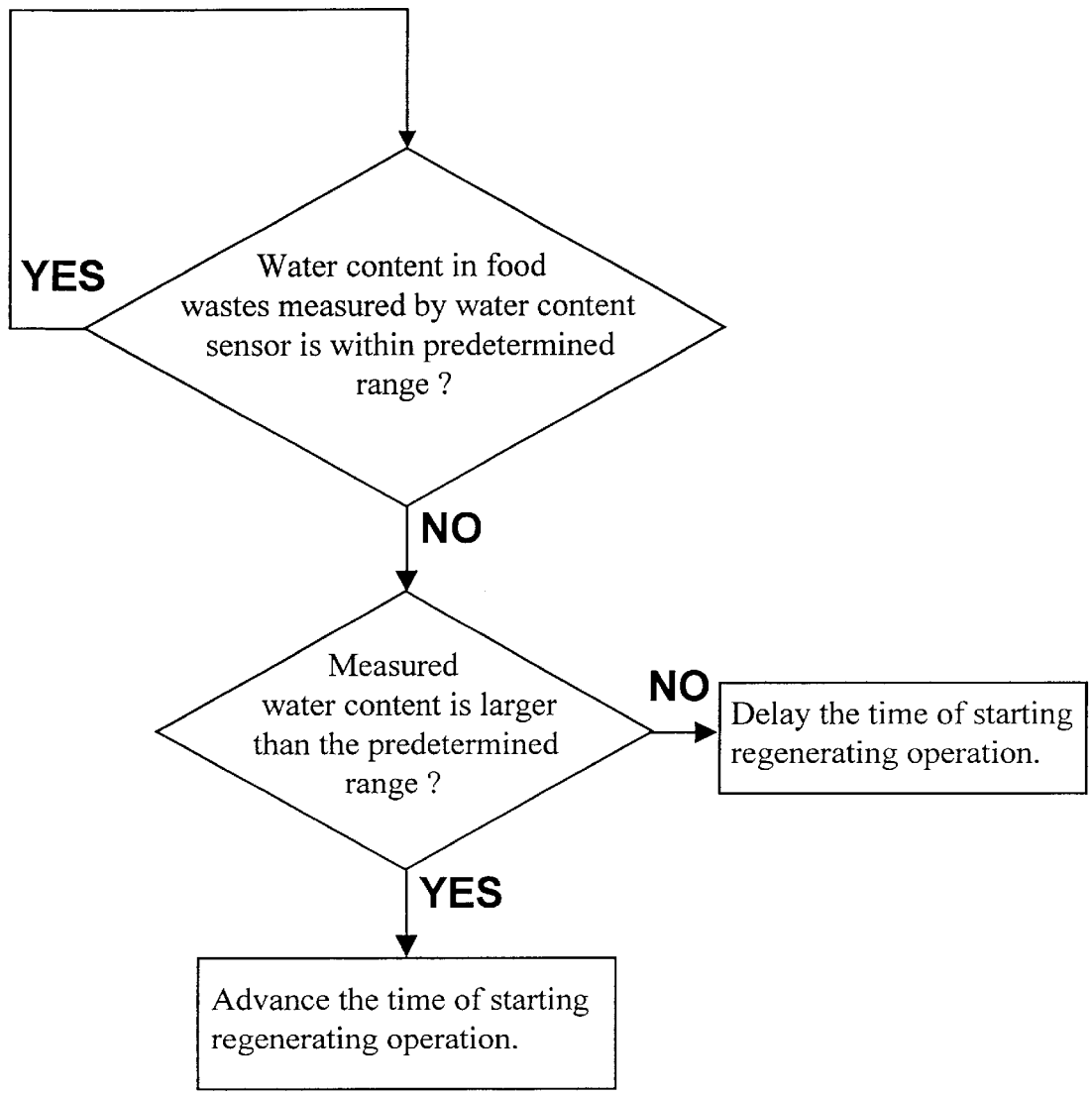
FIG. 5 is a flowchart showing a control system according to an output of a water content sensor of the garbage disposing device of the second embodiment.

As shown in FIG. 5, when the measured water content in the food wastes is larger than the predetermined range, the control unit 3B advances the time of starting the regenerating operation by a time period calculated according to the control signal of the water content sensor 60B. On the other hand, when the measured water content in the food wastes is smaller than the predetermined range, the control unit 3B delays the time of starting the regenerating operation by a time period calculated according to the control signal of the water content sensor 60B. Thus, it is possible to efficiently perform the garbage disposing treatment. A pH sensor for measuring a pH value of the food wastes may be used in place of the water content sensor.

Figure 6:
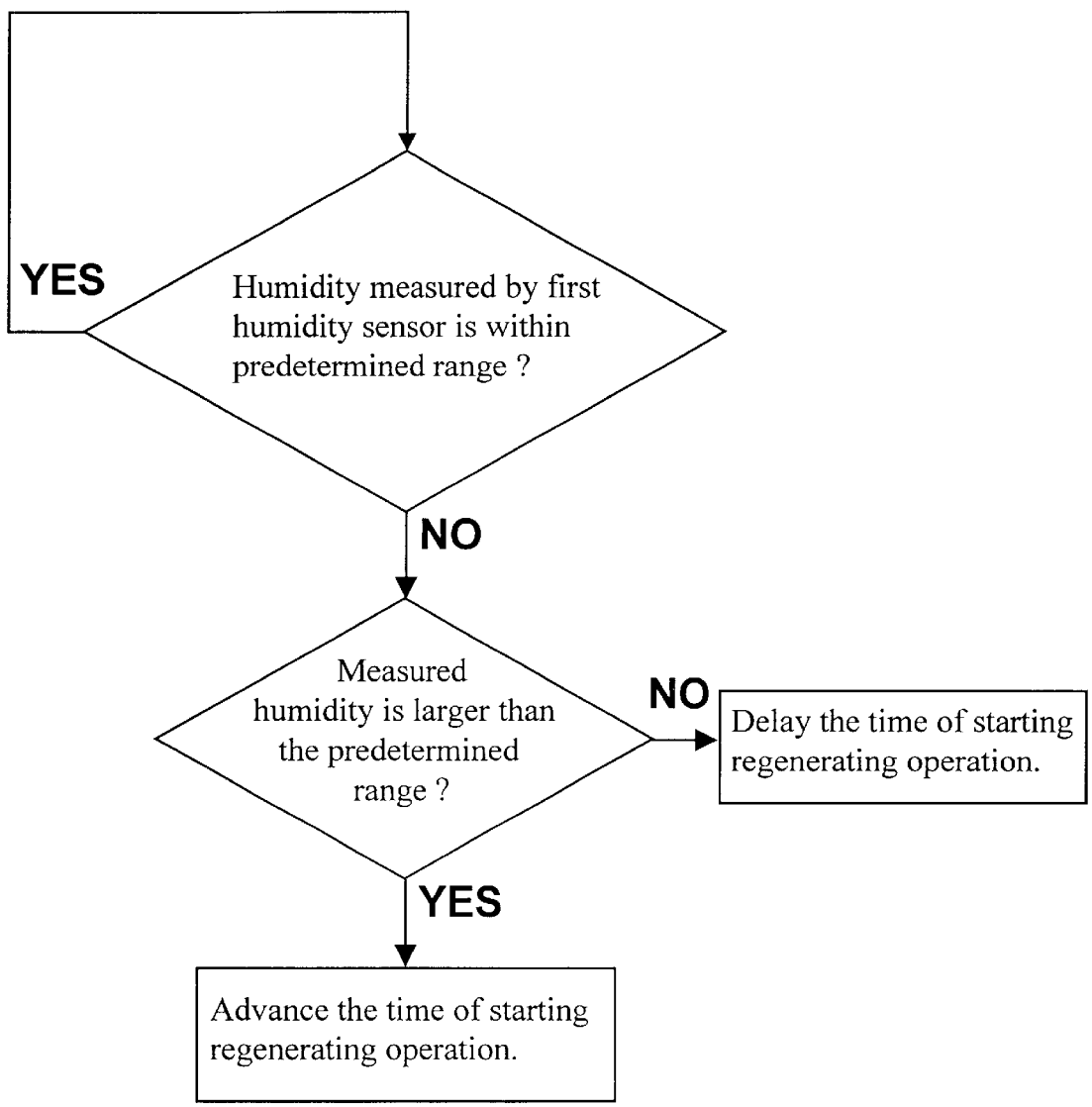
FIG. 6 is a flowchart showing a control system according to an output of a first humidity sensor of the garbage disposing device of the second embodiment.

As shown in FIG. 6, when the measured humidity in the treatment chamber 10B is larger than the predetermined range, the control unit 3B advances the time of starting the regenerating operation by a time period calculated according to the control signal of the first humidity sensor 62B. On the other hand, when the measured humidity is smaller than the predetermined range, the control unit 3B delays the time of starting the regenerating operation by a time period calculated according to the control signal of the first humidity sensor 62B. By using the first ammonia sensor 64B, the time of starting the regenerating operation may be modified according to a similar manner to the first humidity sensor.

In addition, when the measured weight of the food wastes in the treatment chamber is larger than the predetermined range, the control unit 3B advances the time of starting the regenerating operation by a time period calculated according to the control signal of the weight sensor 65B. When the measured weight of the food wastes is smaller than the predetermined range, the controller 3B delays the time of starting the regenerating operation by a time period calculated according to the control signal of the weight sensor.

Figure 7:
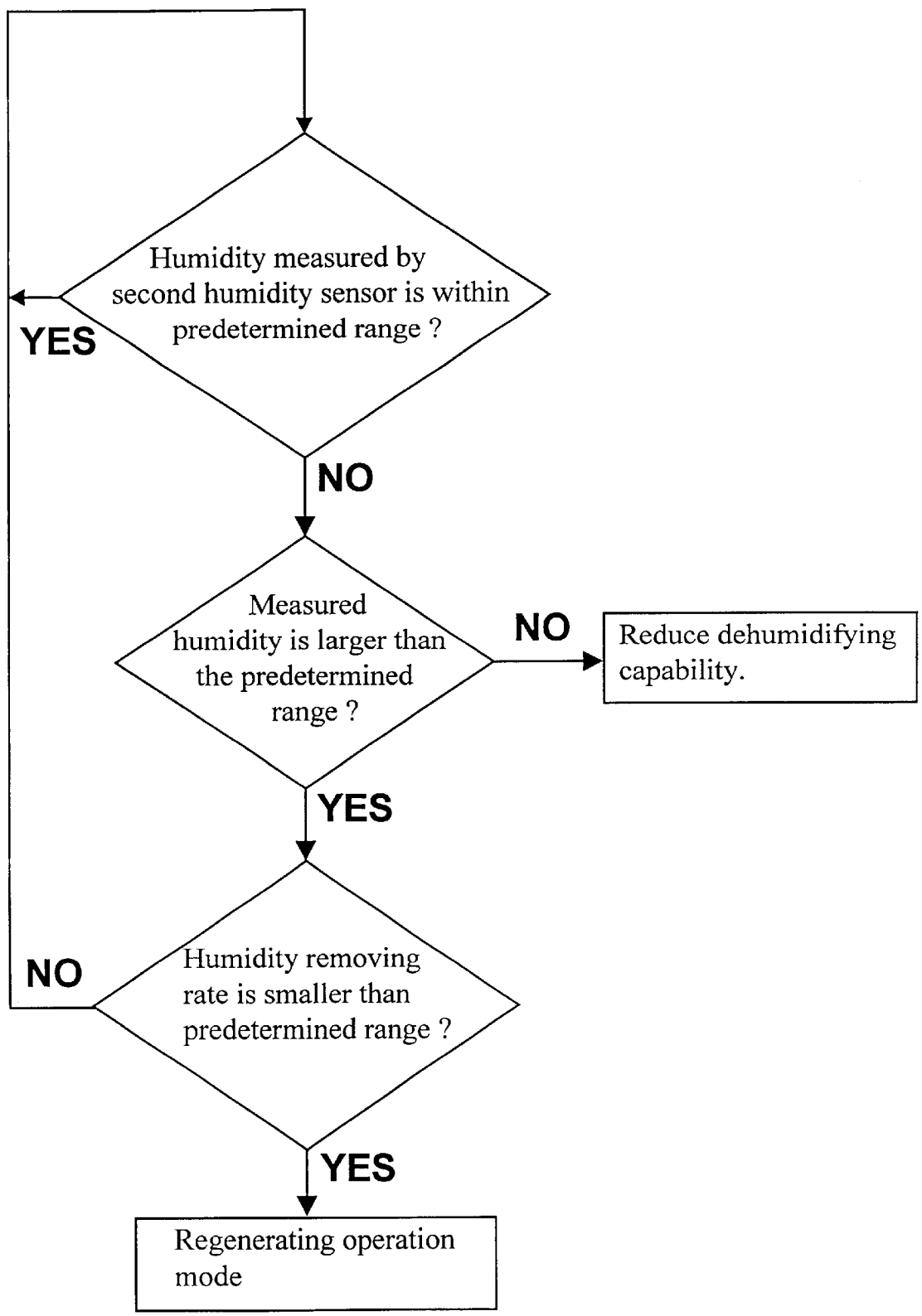
FIG. 7 is a flowchart showing a control system according to an output of a second humidity sensor of the garbage disposing device of the second embodiment.

As shown in FIG. 7, when the humidity measured by the second humidity sensor 63B is smaller than the predetermined range, the control unit 3B lowers an output of the fan 13B to reduce the dehumidifying capability of the dehumidifier 30B. As a result, it is possible to prevent an unusual fermentation caused by an excess drying of the food wastes in the treatment chamber. When the humidity measured by the second humidity sensor 63B is larger than the predetermined range, and a humidity removing rate calculated from the humidity values measured by the first and second humidity sensors 62B and 63B is smaller than a predetermined range, the control unit 3B immediately starts the regenerating operation for the dehumidifying agent 31B. When the humidity removing rate is larger than the predetermined range, the garbage disposing device is returned to the ordinary use mode.

Figure 8:
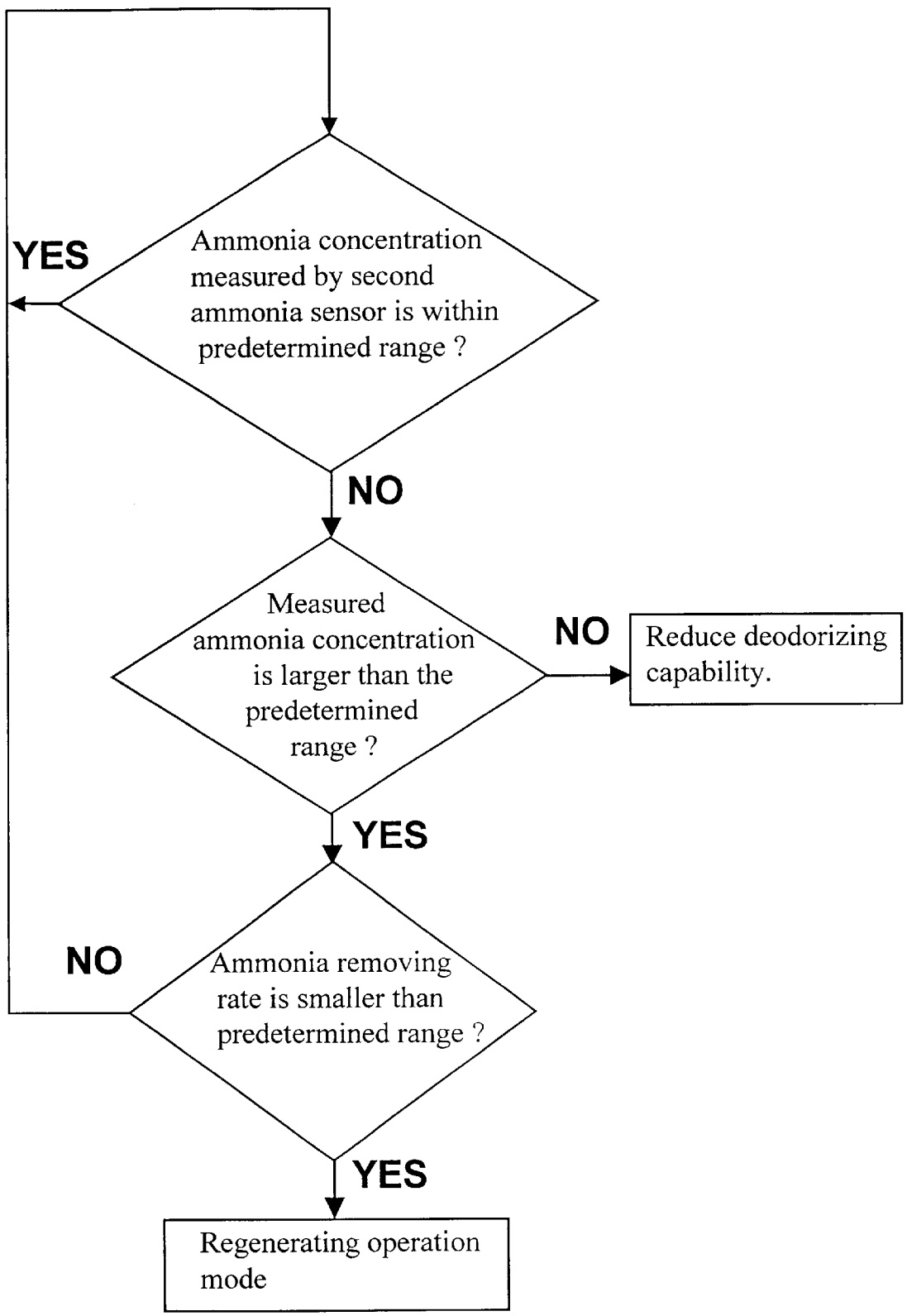
FIG. 8 is a flowchart showing a control system according to an output of a second ammonia sensor of the garbage disposing device of the second embodiment.

As shown in FIG. 8, when the ammonia concentration measured by the second ammonia sensor 65B is smaller than the predetermined range, the control unit 3B lowers the temperature of the catalyst 51B to reduce the deodorizing capability of the deodorizer 50B. On the other hand, when the ammonia concentration measured by the second ammonia sensor 65B is larger than the predetermined range, and an ammonia removing rate calculated from the ammonia concentrations measured by the first and second ammonia sensors 64B and 65B is smaller than a predetermined range, the control unit 3B immediately starts the regenerating operation for the dehumidifying agent 31B. When the ammonia removing rate is larger than the predetermined range, the garbage disposing device is returned to the ordinary use mode.

The first ammonia sensor 64B always monitors the ammonia concentration in the treatment chamber. When the ammonia concentration rapidly increases for some reason, and the measured ammonia concentration exceeds a predetermined value, it is preferred that the control unit 3B copes with the unusual ammonia concentration by closing the exhaust passage 21B by the exhaust airflow adjuster 40B to stop the airflow exhausted to the outside through the deodorizer 50B, or lowering the output of the fan 13B to reduce the air amount exhausted through the exhaust port, or increasing the deodorizing capability of the deodorizer 50B. In particular, it is preferred to control the exhaust airflow adjuster 40B from the viewpoint of preventing the occurrence of ammonia leakage to the outside.

Figure 9:
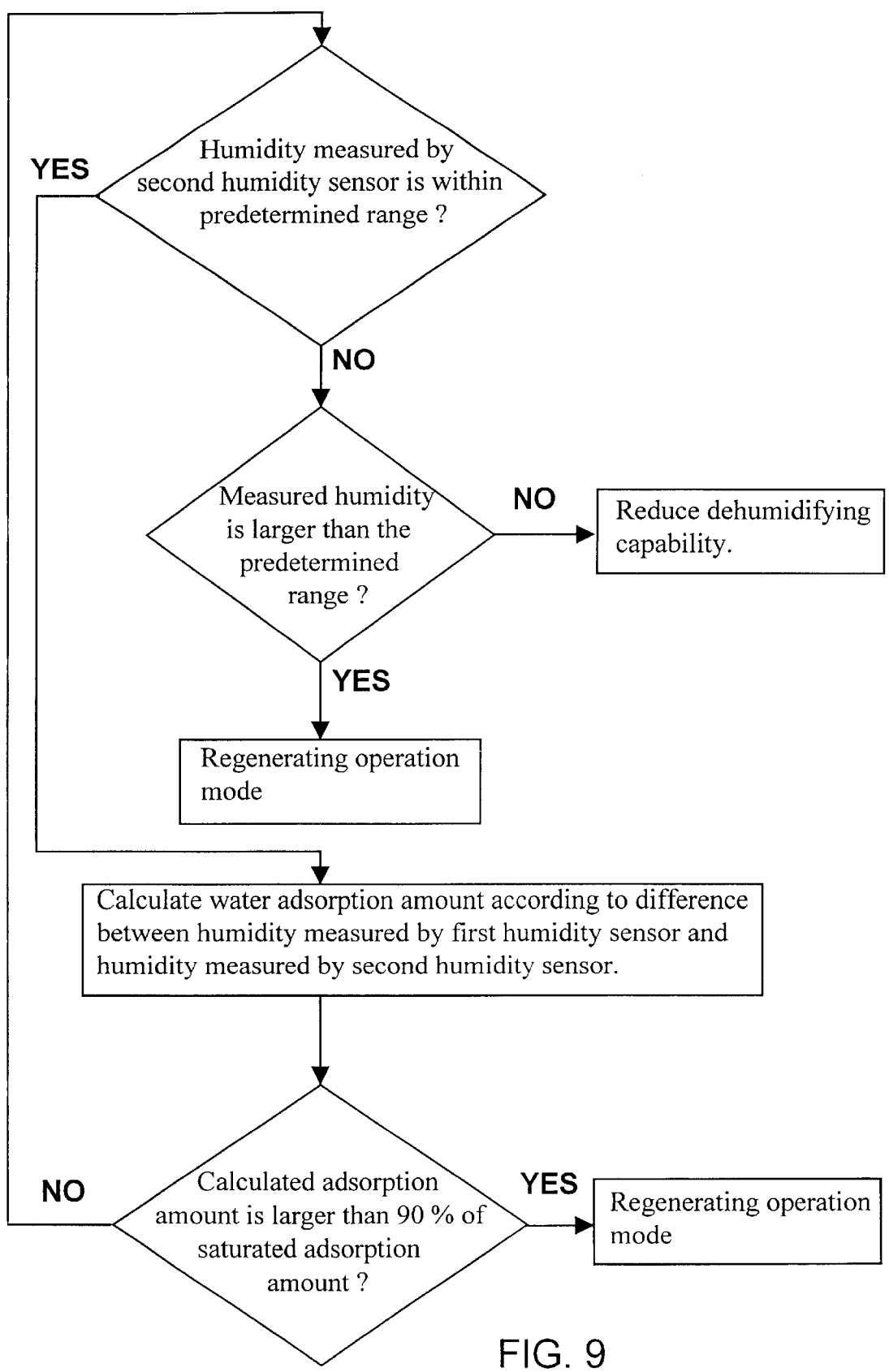
FIG. 9 is a flowchart showing a further control system of the garbage disposing device of the second embodiment.

When the humidity of the air provided from the dehumidifier 30B is within the predetermined range, the time of starting the regenerating mode for the dehumidifying agent 31B can be determined according to the control signal of the second humidity sensor 63B. That is, as shown in FIG. 9, the control unit 3B estimates a water adsorption amount of the dehumidifying agent 31B from a difference between a first humidity value measured by the first humidity sensor (that is, the humidity at upstream of the dehumidifier 30B) and a second humidity value measured by the second humidity sensor 63B (that is, the humidity detected at downstream of the dehumidifier). When the estimated adsorption amount is 90% or more of a saturated adsorption amount, the regenerating operation is started. This control method provides an advantage of starting the regenerating operation before the dehumidifying capability of the dehumidifying agent 31B is lost. The regenerating operation is completed according to the control signals of the first and second humidity sensors. That is, when the difference between the first and second humidity values becomes zero, the supply of electric power to the heater 32B of the dehumidifier 30B is stopped to finish the regenerating operation. Next, the cooling operation of the dehumidifying agent 30B is performed. By using the first and second ammonia sensors 64B and 65B, the time of starting the regenerating operation may be modified according to a similar manner to the above.

The garbage disposing device 1B of this embodiment includes a safety system for preventing an accident that the air including unpleasant odor be exhausted from the garbage disposing device. That is, when the measured weight of the food wastes 2B is larger than the predetermined range, or an output including an information that the measured water content in the food wastes measured by the water content sensor is larger than the predetermined range is maintained for a constant time period, or an output including an information that the ammonia concentration measured by the first ammonia sensor 64B or the second ammonia sensor 65B is larger than the predetermined range is maintained for a constant time period, the control unit 3B raises the catalyst temperature of the deodorizer 50B to increase the deodorizing capability. When the ammonia concentration measured by the third ammonia sensor 66B is larger than the predetermined range, the catalyst temperature is further raised.

Figure 10:
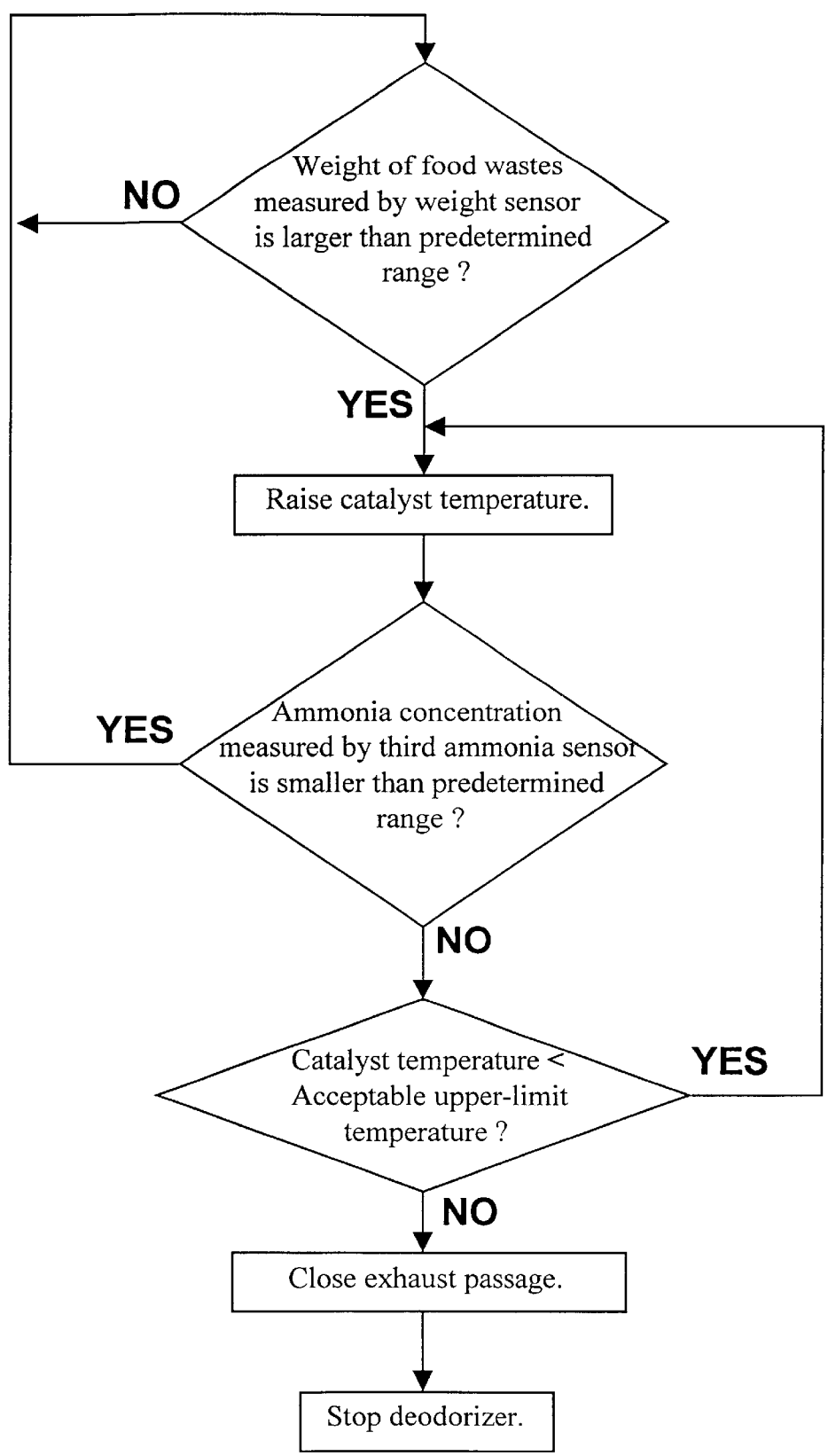
FIG. 10 is a flowchart showing another control system of the garbage disposing device of the second embodiment.

When this situation is not improved though the catalyst temperature reaches an acceptable upper-limit temperature, the exhaust passage 31B is closed by the exhaust airflow adjuster 40B to stop the airflow to the deodorizer 50B, and heating the catalyst 51B is stopped. A flow chart of the above safety system operated according to the output of the weight sensor 65B is shown in FIG. 10. Alternatively, a sensor for detecting an odor component except for ammonia can be used.

Figure 11:
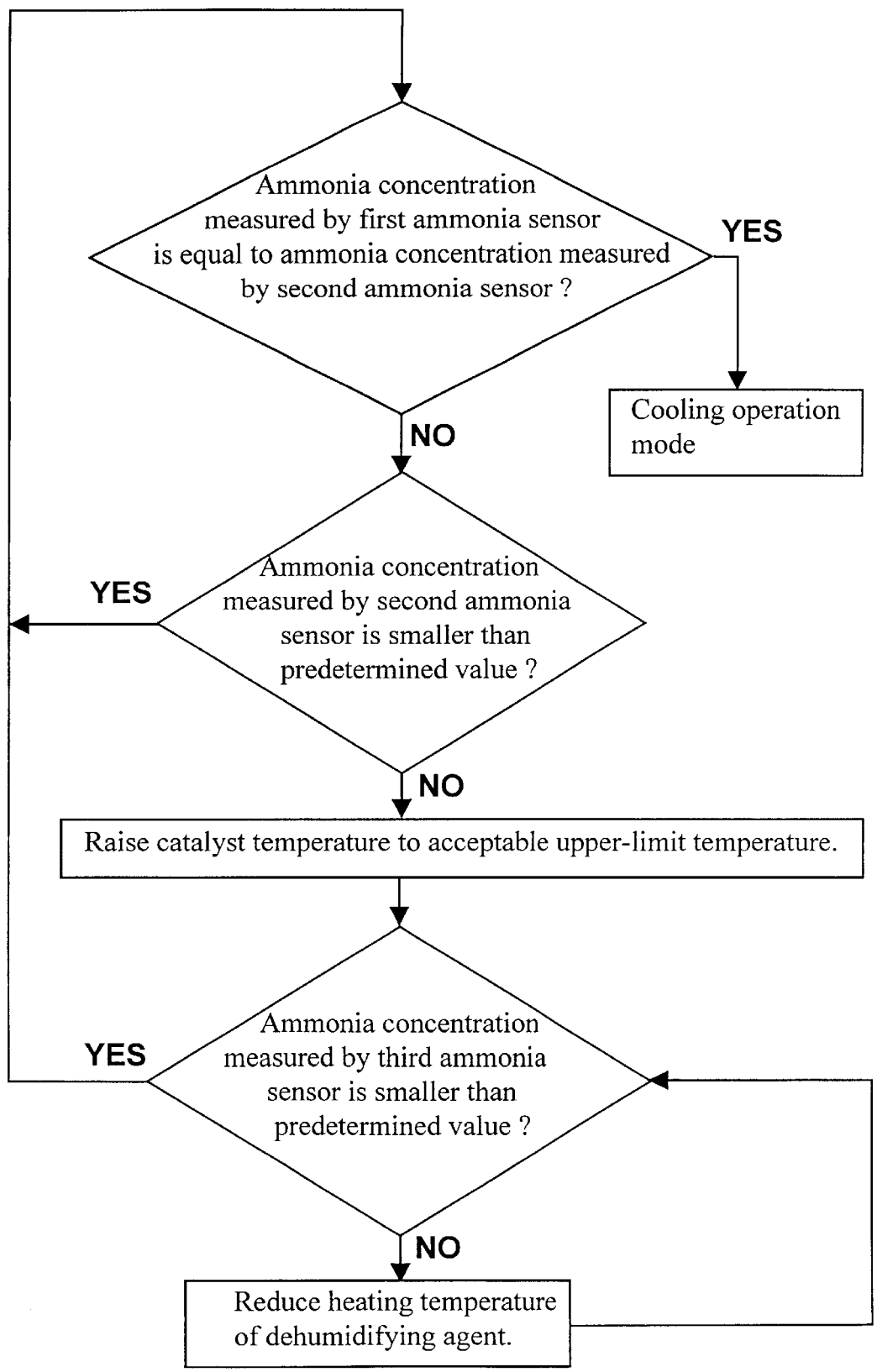
FIG. 11 is a flowchart showing a control system according to an output of a sensor for sensing a weight of food wastes of the garbage disposing device of the second embodiment.

In the garbage disposing device 1B of this embodiment, the deodorizer 50B is controlled according to the following manner during the regenerating operation for the dehumidifying agent 30B. That is, as shown in FIG. 11, when the ammonia concentration measured by the first ammonia sensor 64B is equal to that measured by the second ammonia sensor 65B, it is regarded that the regenerating operation has been completed, and the cooling operation mode is started.

On the other hand, when the ammonia concentration measured by the second ammonia sensor is not equal to the ammonia concentration measured at upstream of the dehumidifier 30B, and it is larger than a predetermined value, the control unit 3B raises the catalyst temperature 51B to the acceptable upper-limit temperature. When the ammonia concentration measured by the third ammonia sensor 66B is smaller than a predetermined value, the regenerating operation is continued. On the contrary, when the ammonia concentration measured by the third ammonia sensor 66B is the predetermined value or more, the control unit 3B reduces the heater temperature of the dehumidifier 30B to lower a removing rate of ammonia from the dehumidifying agent 31B. By using a sensor for detecting an odor component except for ammonia, the deodorizer can be controlled according to the similar manner to the above.

The catalyst 51B of the deodorizer 50B of the garbage disposing device 1B must be exchanged after being used for an extended time period. In case of using an adsorbent for the deodorizer, the exchanging operation must be performed at the end of life of the adsorbent. The time of exchanging the catalyst can be determined as follows. That is, the control unit 3B calculates an ammonia removing rate from the ammonia concentrations measured by the second and third ammonia sensors 65B and 66B. When the ammonia removing rate is smaller than a predetermined value, the control unit 3B lights an indication lamp to inform the time of exchanging the catalyst to the user of the garbage disposing device.

Figure 12:
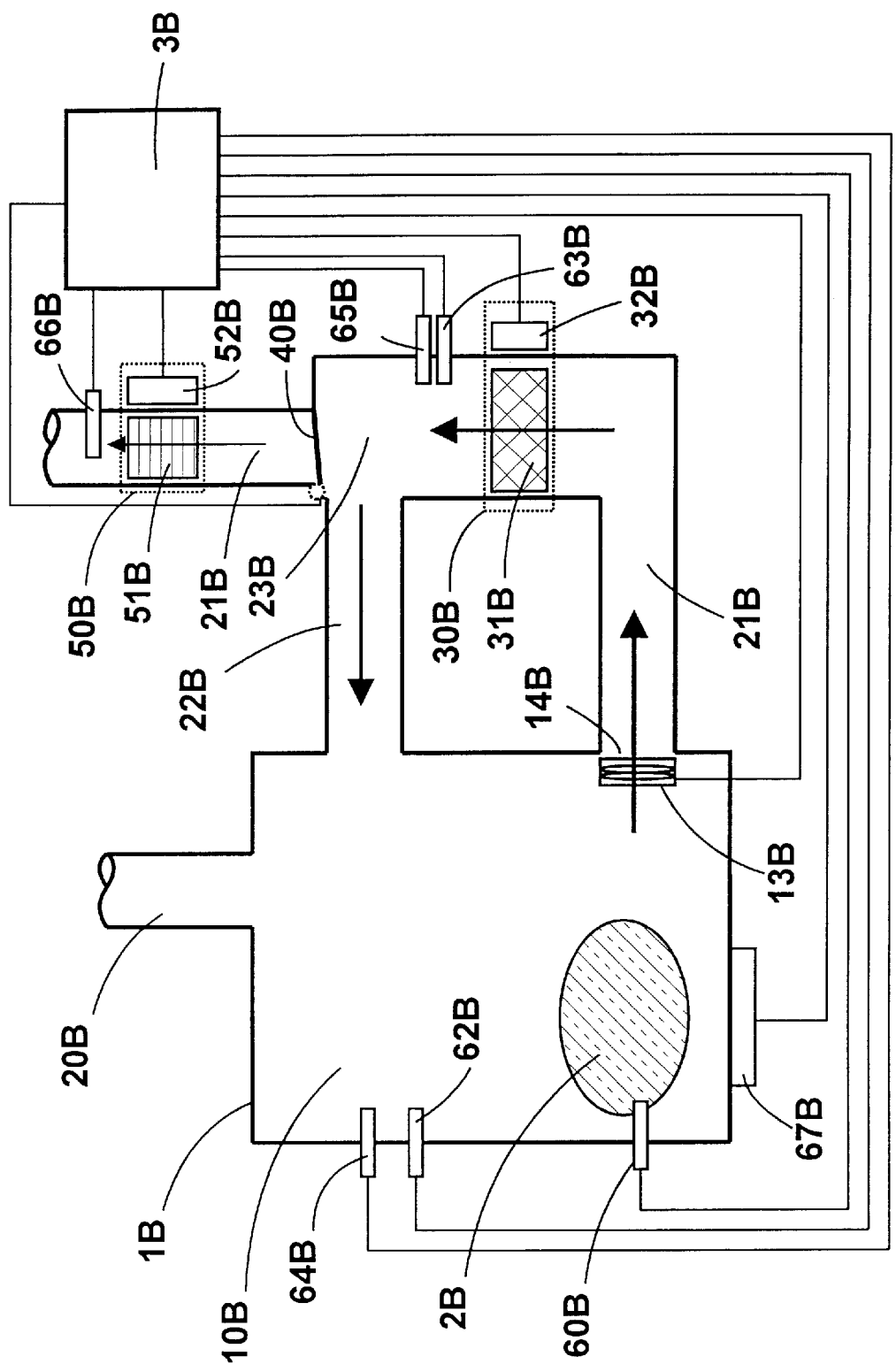
FIG. 12 is a schematic diagram showing a special control mode of the garbage disposing device of the second embodiment used when dried food wastes are treated in a treatment chamber.

As a particular case, when excessively dried food wastes are put in the treatment chamber, it is necessary to supply water for the decomposition of the food wastes by the microorganism. In this case, it is preferred to perform the following control. That is, as shown in FIG. 12, the control unit 3B closes the exhaust passage 21B by the exhaust airflow adjuster 40B according to an output of the water content sensor 60B or the first humidity sensor 62B, which informs that the food wastes are excessively dried. Subsequently, the regenerating operation for the dehumidifying agent 31B is started to remove water vapor adsorbed on the dehumidifying agent 31B. The removed water vapor is returned to the treatment chamber through the return path 22B. Thus, an amount of the water vapor can be supplied to the food wastes put in the treatment chamber. When the output of the water content sensor or the first humidity sensor reaches the predetermined range, the ordinary use mode of the garbage disposing device is performed, as explained in the first embodiment.

As described above, various kinds of sensors are used in the garbage disposing device of this embodiment. If necessary, it is possible to optionally omit some of these sensors.

Third Embodiment

Figure 13:
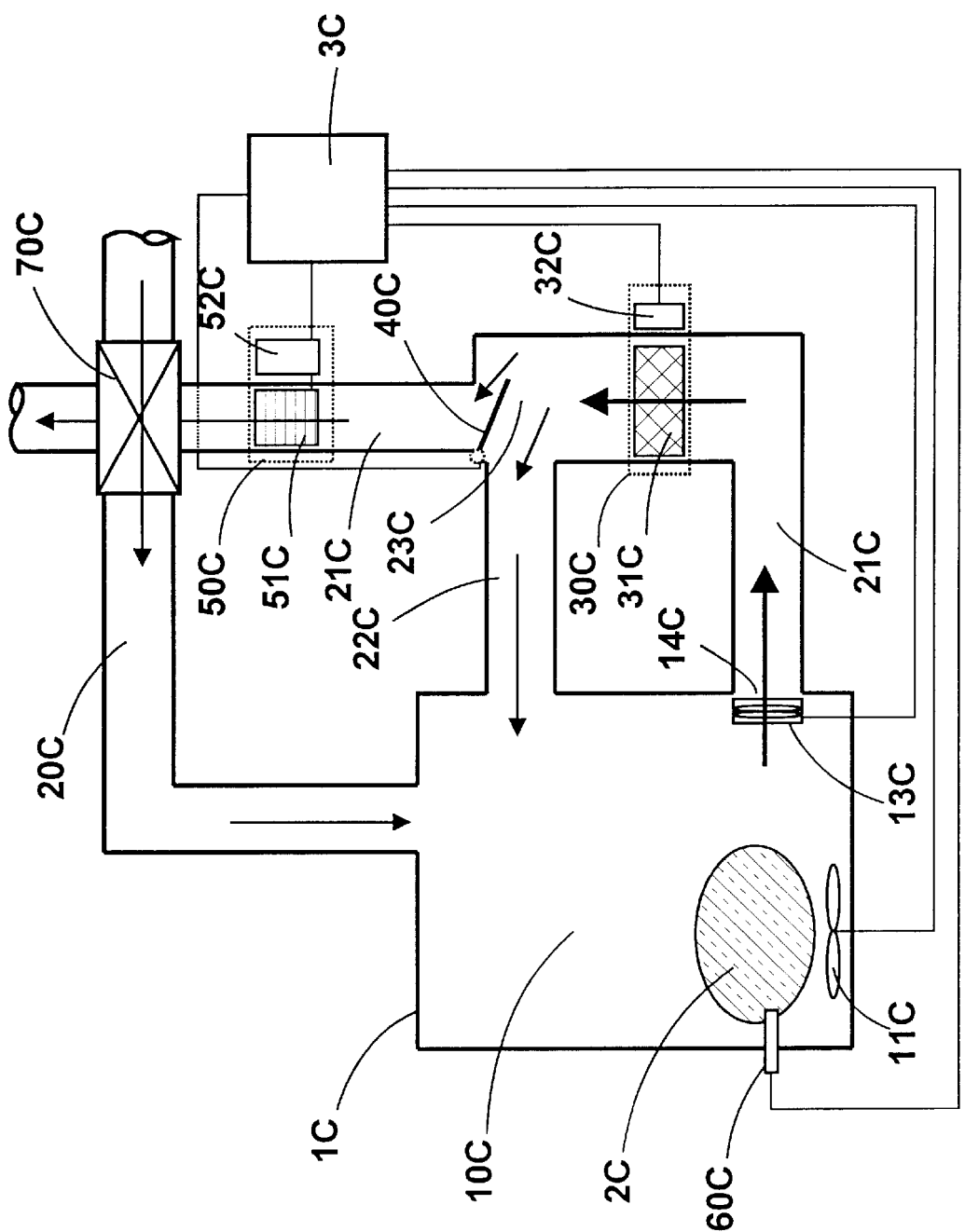
FIG. 13 is a schematic diagram of a garbage disposing device of a third embodiment of the present invention.

A schematic diagram of a garbage disposing device of the third embodiment is shown in FIG. 13. This garbage disposing device 1C is substantially equal to that of the first embodiment except for the following features. Therefore, no duplicate explanation to common parts and operations is deemed necessary. In the drawings, like parts are designated by reference numerals with a suffixed letter of "C".

In the garbage disposing device 1C of this embodiment, a heat exchanger 70C for collecting waste heat from the air exhausted to the outside through an exhaust passage 21C is provided at downstream of a deodorizer 50C. The waste heat collected by the heat exchanger can be used to warm a fresh air passing an intake passage 20C. Since the warmed fresh air is supplied into a treatment chamber 10C, it is possible to enhance the decomposition of food wastes by the microorganism.

By the way, the treatment chamber 10C exhausts an air including a large amount of water vapor and a corrosive gas such as ammonia. Since the heat exchanger 70C is disposed at downstream of a dehumidifier 30C and the deodorizer 50C, it is not exposed to the corrosive gas. Therefore, it is not necessary to use a heat exchanger made of an expensive corrosion-resistance material for the garbage disposing device of this embodiment. Thus, it is possible to prevent a rise in the total cost of the garbage disposing device, and provide energy conservation by using the waste heat.

Fourth Embodiment

Figure 14:
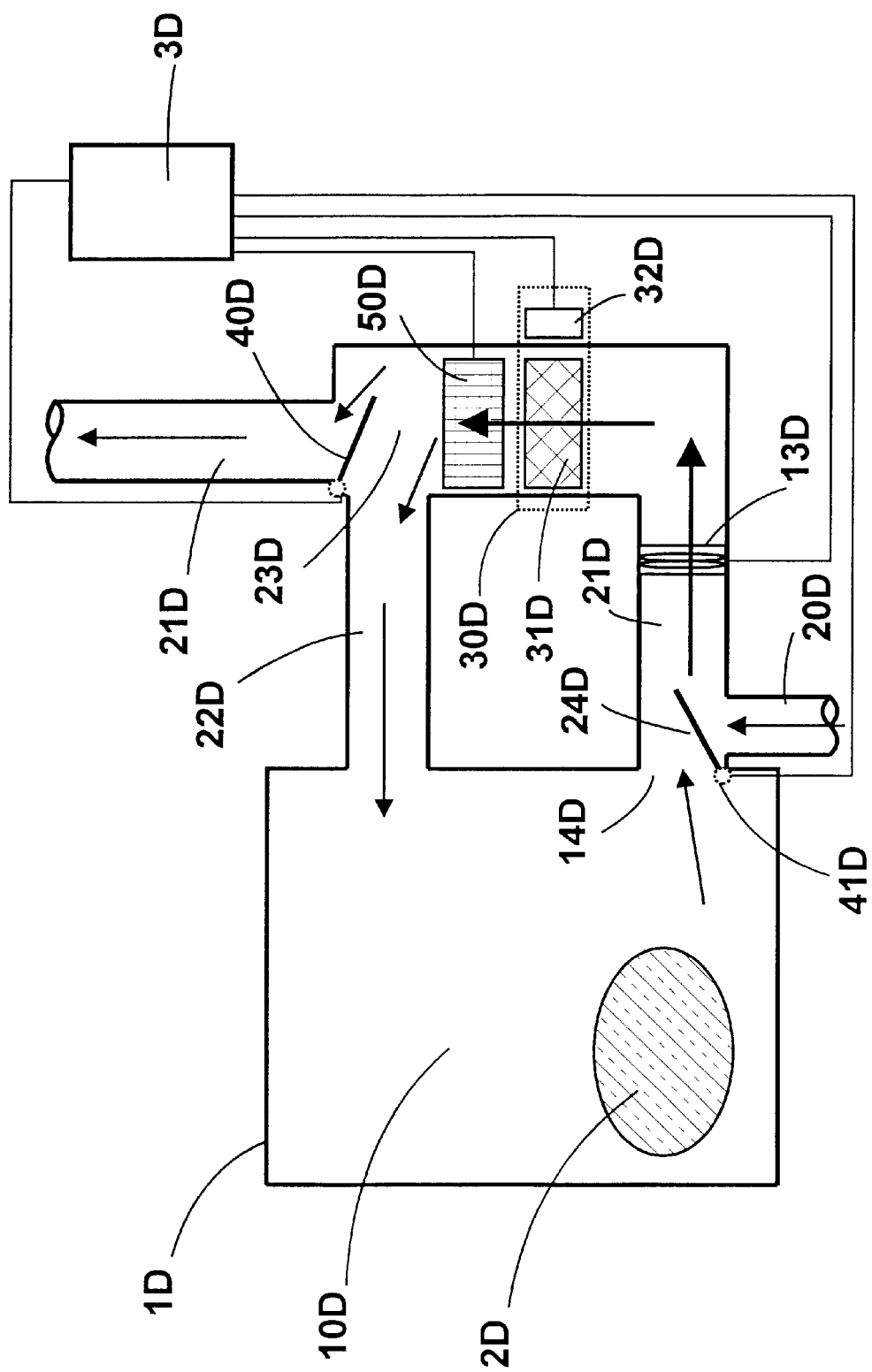
FIG. 14 is a schematic diagram showing an ordinary use mode of a garbage disposing device of a fourth embodiment of the present invention.
Figure 15:
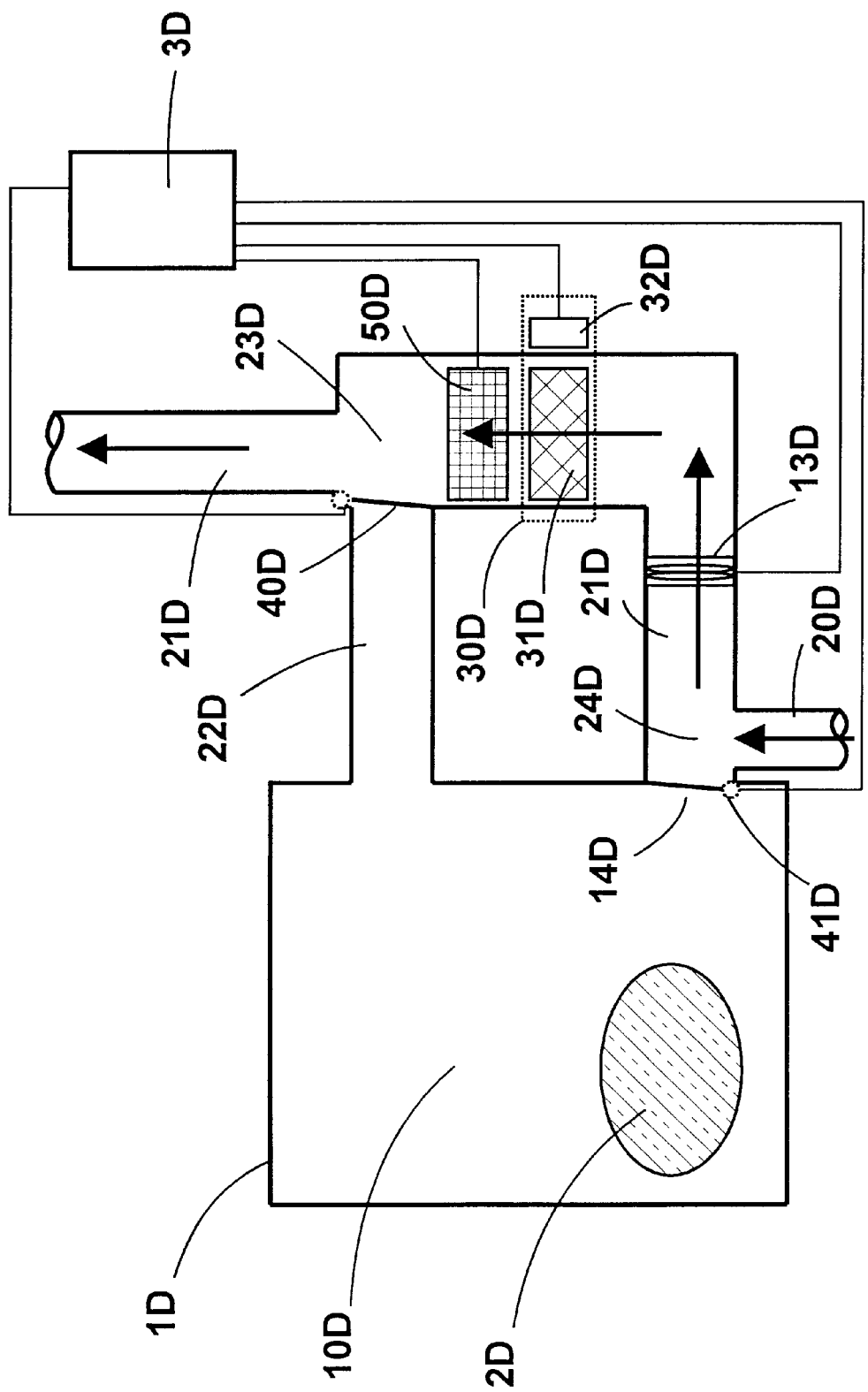
FIG. 15 is a schematic diagram showing a regenerating operation mode for a dehumidifying agent of the garbage disposing device of the fourth embodiment.
Figure 16:
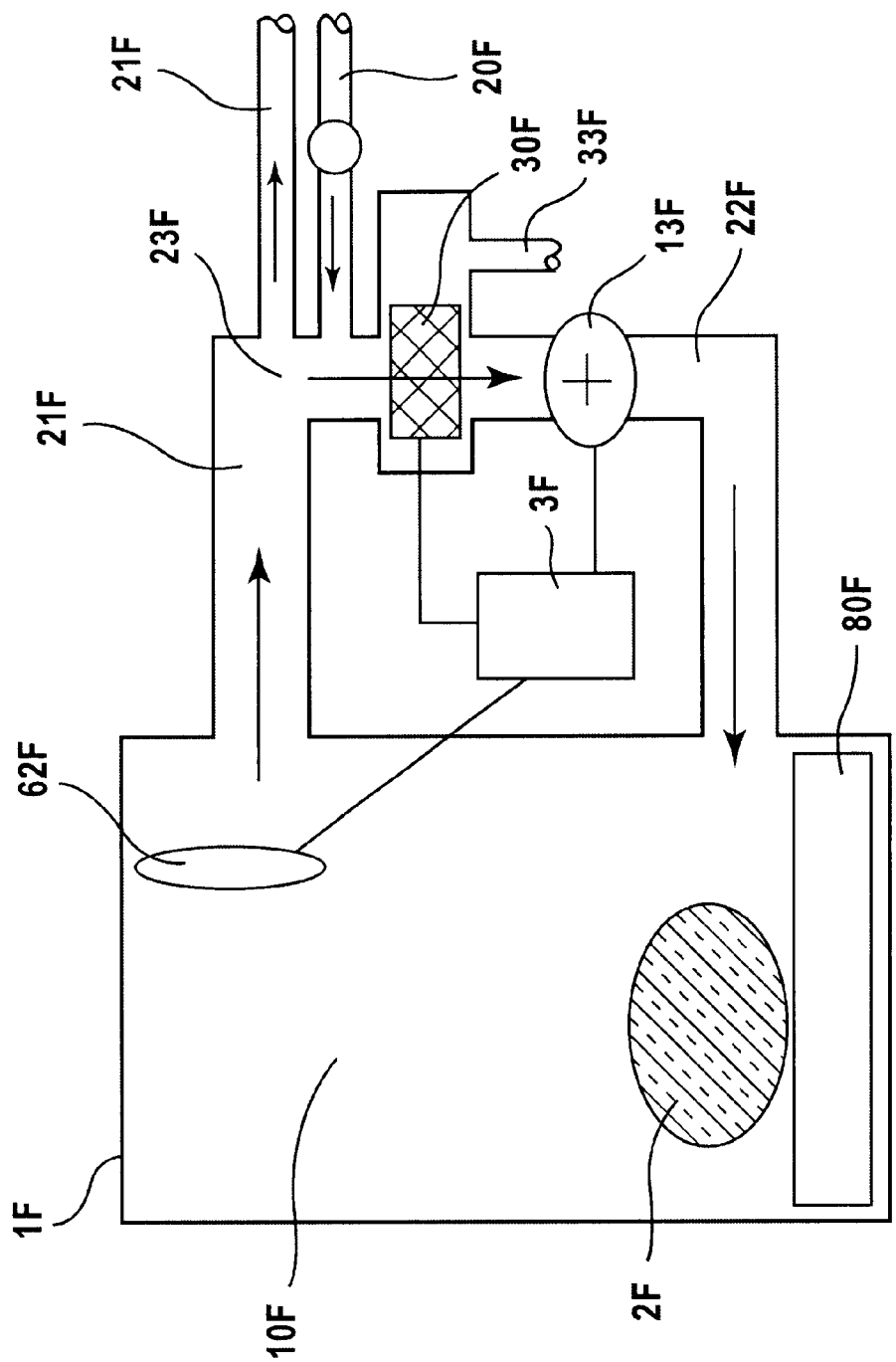
FIG. 16 is a schematic diagram showing a garbage disposing device of the prior art.

Schematic diagrams of a garbage disposing device of the fourth embodiment of the present invention are shown in FIGS. 14 and 15. This garbage disposing device 1D has a treatment chamber 10D used to decompose food wastes by a microorganism, and an exhaust passage 21D connected to an outlet 14D of the treatment chamber at one end and having an exhaust port at the other end. In the exhaust passage 21D, a fan 13D is provided to send an air including unpleasant odor generated by the decomposition of the food wastes to the exhaust passage. To introduce a fresh air from an outside into the exhaust passage 21D, an intake passage 20D is connected to the exhaust passage at a first diverging portion 24D formed at upstream of the fan 13D. A dehumidifier 30D for dehumidifying the air provided by the fan 13D is provided at downstream of the fan 13D in the exhaust passage 21D. The dehumidifier 30D is formed with a dehumidifying agent 31D and a heater 32D for removing water adsorbed on the dehumidifying agent to regenerate the dehumidifying agent. The dehumidifier explained in the first embodiment can be used in this embodiment.

A return path 22D extends from a second diverging portion 23D formed at downstream of the dehumidifier 30D in the exhaust passage 21D to the treatment chamber 10D. In this embodiment, a deodorizer 50D is disposed between the dehumidifier 30D and the second diverging portion 23D in the exhaust passage 21D. The deodorizer explained in the first embodiment can be used in this embodiment. A first exhaust airflow adjuster 41D is provided at the first diverging portion 24D to regulate an amount of the fresh air introduced from the intake passage 20D. In addition, a second exhaust airflow adjuster 40D is provided at the second diverging portion 23D to regulate an air amount returned to the treatment chamber 10D through the return path 22D. A control unit 3D controls the first and second exhaust airflow adjusters.

Next, an operation of the garbage disposing device 1D of this embodiment is explained. In an ordinary use mode for the decomposition of the food wastes by the microorganism, as shown in FIG. 14, the control unit 3D sets the first exhaust airflow adjuster 41D to an open position, where the air provided from the treatment chamber 10D to the exhaust passage 21D is mixed with the fresh air supplied from the intake passage 20D. In addition, the second exhaust airflow adjuster 40D is set to an open position, where a part of the air provided from the dehumidifier 30D is exhausted through the exhaust passage 21D, and the balance of the air is returned to the treatment chamber 10D through the return path 22D. The control unit 3D also heats a catalyst of the deodorizer 50D. Since most of ammonia, which is a main component of the unpleasant odor, can be removed by the dehumidifier 30D, it is possible to reduce the deodorizing capability of the deodorizer 50D. In the garbage disposing device of this embodiment, even when a humidity of the fresh air is high, the fresh air introduced through the intake passage 20D firstly passes the dehumidifier 30D before the treatment chamber 10D. Therefore, it is possible to avoid a situation that the fresh air having the high humidity be directly introduced into the treatment chamber.

In a regenerating operation mode for removing water and ammonia adsorbed on the dehumidifying agent 31D, as shown in FIG. 15, the control unit 3D sets the first exhaust airflow adjuster 41D to a close position, where the exhaust passage 21D is separated from the treatment chamber 10D such that only the fresh air introduced from the intake passage 20D flows in the exhaust passage. In addition, the control unit 3D sets the second exhaust airflow adjuster 40D to a close position, where the return path 22D is substantially isolated from the exhaust passage 21D at the second diverging portion 23D. The control unit 3D also controls the heater 32D to heat the dehumidifying agent 31D and remove the adsorbed water and ammonia from the dehumidifying agent. Since the return path 22D is isolated, the removed water and ammonia from the dehumidifying agent 31D are not returned to the treatment chamber 10D. In addition, since the treatment chamber 10D is separated from the exhaust passage 21D by the first exhaust airflow adjuster 41D, it is possible to perform the regenerating operation for the dehumidifying agent 31D with the fresh air introduced through the intake passage 20D without using the air including unpleasant odor and water vapor provided from the treatment chamber 10D. This is useful to shorten time required for the regenerating operation.

In the regenerating operation, all of the air including the unpleasant odor such as ammonia removed from the dehumidifier 31D is supplied to the deodorizer 50D. Therefore, it is necessary to increase the deodorizing capability of the deodorizer 50D to treat a high concentration of ammonia. When the deodorizer 50D is composed of a catalyst and a heater, it is preferred to heat the heater at an acceptable upper-limit temperature. A humidity sensor (not shown) for measuring a humidity of the air provided from the dehumidifier 30D is disposed in the exhaust passage 21D. When the measured humidity is smaller than a predetermined value, the control unit 3D stops a supply of electric current to the heater 32D of the dehumidifier 30D.

After the regenerating operation for the dehumidifying agent 31D is finished, a cooling operation mode for the dehumidifying agent is performed. In the cooling operation, the close positions of the first and second exhaust airflow adjusters (41D, 40D) are maintained. Since the water vapor and ammonia are already removed from the dehumidifying agent 31D, only the fresh air passes the deodorizer 50D. Therefore, it is not necessary to operate the deodorizer 50D. By introducing a large amount of the fresh air into the exhaust passage 21D from the intake passage 20D by the fan 13D, it is possible to provide a rapid cooling operation for the dehumidifying agent 31D. Since the treatment chamber 10D is isolated from the exhaust passage 21D, there is no need to worry about a leakage of the unpleasant odor to the outside during the cooling operation. Thus, it is possible to provide a practical garbage disposing device capable of stably performing the garbage disposing treatment regardless of the humidity of the outside air, and efficiently performing the regenerating and cooling operations for the dehumidifying agent.

The present invention has been explained above according to preferred embodiments. However, the present invention is not limited to these embodiments. The present invention will cover various modifications of the embodiments. Therefore, the present invention should be interpreted according to claims.

What is claimed is:

1. A garbage disposing device comprising:
   a treatment chamber used to decompose food wastes by a microorganism,
   said chamber having an outlet;
   an intake passage for supplying a fresh air to said treatment chamber from an outside;
   an exhaust passage connected to said outlet of said treatment chamber at one end and having an exhaust port at the other end;
   a dehumidifier provided in said exhaust passage, said, dehumidifier including a dehumidifying agent and a regenerating unit for removing water adsorbed on said dehumidifying agent to regenerate said dehumidifying agent;
   a return path extending from a diverging portion in said exhaust passage, which is positioned at downstream of said dehumidifier, to said treatment chamber;
   a ventilator provided at upstream of said diverging portion to send an air containing unpleasant odor, which is generated in said treatment chamber during the decomposition of said food wastes, toward the outside through said exhaust passage;
   a deodorizer provided between said dehumidifier and said exhaust port in said exhaust passage to remove the unpleasant odor from the air to be exhausted through said exhaust port;
   an exhaust airflow adjuster provided at said diverging portion to adjust when said garbage disposing device is in an ordinary use mode, said exhaust airflow adjuster is set to a first position where a part of an air provided from said dehumidifier is exhausted through said exhaust port, and the remaining air is returned to said treatment chamber through said return path, and when said garbage disposing device is in a regenerating operation mode for said dehumidifying agent, said exhaust airflow adjuster is set to a second position where said return, path is closed at said diverging portion wherein said control unit includes means for setting said exhaust airflow adjuster to a third position where said exhaust passage is closed at said diverging portion such that all of the air provided from said dehumidifier is returned to said treatment chamber through said return path.

2. The garbage disposing device as set forth in claim 1, wherein said dehumidifying agent is a solid acid.

3. The garbage disposing device as set forth in claim 1, wherein said dehumidifying agent is silica gel.

4. The garbage disposing device as set froth in claim 1, wherein said deodorizer is provided at downstream of said diverging portion in said exhaust passage.

5. The garbage disposing device as set forth in claim 4, wherein an additional deodorizer for deodorizing an unpleasant odor except for ammonia is provided between said dehumidifier and said diverging portion in said exhaust passage.

6. The garbage disposing device as set forth in claim 1, wherein said device includes a first detector for detecting an amount of water adsorbed on said dehumidifying agent, and providing a first control signal to said control unit when the water amount exceeds a predetermined amount, and a second detector for detecting an amount of ammonia adsorbed on said dehumidifying agent, and providing a second control signal to said control unit when the ammonia amount exceeds a predetermined amount, and wherein said control unit starts said regenerating unit in response to either said first control signal or said second control signal.

7. The garbage disposing device as set forth in claim 1, further comprising a timer unit for providing a control signal to said control unit when the time used of said dehumidifying agent reaches a predetermined time, and wherein said control unit sets said exhaust airflow adjuster to said second position and starts said regenerating unit according to the control signal.

8. The garbage disposing device as set forth in claim 7, wherein said device includes a detector capable of detecting at least one parameter selected from a humidity in said treatment chamber, ammonia concentration in said treatment chamber, water content of said food wastes, pH value of said food wastes, and a weight of said food wastes, and wherein said control unit changes the predetermined time of said timer unit in response to an output provided from said detector.

9. The garbage disposing device as set forth in claim 1, wherein said device includes a detector for detecting a concentration of an unpleasant odor component generated in said treatment chamber and providing a control signal to said control unit when the detected concentration value exceeds a predetermined value, and wherein said control unit sets said exhaust airflow adjuster to the third position in response to said control signal.

10. The garbage disposing device as set forth in claim 1, wherein said device includes a stirring unit for stirring said food wastes in said treatment chamber; and wherein said control unit sets said exhaust airflow adjuster to the third position during an operation of said stirring unit.

11. The garbage disposing device as set forth in claim 1, wherein said device includes a heat exchanger provided between said deodorizer and said exhaust port in said exhaust passage, and wherein the fresh air supplied to said treatment chamber through said intake passage is warmed by a waste heat collected from an air passing said exhaust passage by said heat exchanger.

12. The garbage disposing device as set forth in claim 1, wherein said device includes a detector for detecting at least one value selected from a water content in said food wastes, humidity in said treatment chamber, and a weight of said food wastes in said treatment chamber, and providing a control signal to said control unit when the detected value exceeds a predetermined value, and wherein in response to said control signal, said control unit increases an airflow amount of said ventilator and regulates an opening amount of said exhaust passage by said exhaust airflow adjuster such that an air amount exhausted through said exhaust port is equal to a predetermined amount.

13. The garbage disposing device as set forth in claim 1, wherein said device includes a humidity sensor for measuring a humidity of the air provided from said dehumidifier, and wherein said control unit stops the regenerating operation for said dehumidifying agent when the measured humidity reaches less than a predetermined humidity during the regenerating operation.

14. The garbage disposing device as set forth in claim 1, wherein said control unit sets said exhaust airflow adjuster to the third position after said dehumidifying agent is heated to remove the adsorbed water therefrom by said regenerating unit, so that said dehumidifying agent is cooled by a circulating air flowing in a closed path composed of said treatment chamber, a part of said exhaust passage and said return path.

15. A garbage disposing device comprising:

a treatment chamber used to decompose food wastes by a microorganism, said chamber having an outlet;

an intake passage for supplying fresh air to said treatment chamber from an outside;

an exhaust passage connected to said outlet of said treatment chamber at one end and having an exhaust port at the other end;

a dehumidifier provided in said exhaust passage, said dehumidifier including a dehumidifying agent and a regenerating unit for removing water adsorbed on said dehumidifying agent to regenerate said dehumidifying agent;

a return path extending from a diverging portion in said exhaust passage, which is positioned at downstream of said dehumidifier, to said treatment chamber;

a ventilator provided at upstream of said diverging portion to send an air containing unpleasant odor, which is generated in said treatment chamber during the decomposition of said food wastes, toward the outside through said exhaust passage;

a deodorizer provided between said dehumidifier and said exhaust port in said exhaust passage to remove the unpleasant odor from the air to be exhausted through said exhaust port;

an exhaust airflow adjuster provided at said diverging portion to adjust an air amount to be returned from said exhaust passage to said treatment chamber through said return path; and a control unit for controlling said exhaust airflow adjuster such that:

when said garbage disposing device is in an ordinary use mode, said exhaust airflow adjuster is set to a first position where a part of an air provided from said dehumidifier is exhausted through said exhaust port, and the remaining air is returned to said treatment chamber through said return path, and when said garbage disposing device is in a regenerating operation mode for said dehumidifying agent, said exhaust airflow adjuster is set to a second position where said return path is closed at said diverging portion, wherein said ventilator is provided in said exhaust passage; said intake passage is connected to said exhaust passage at an additional diverging portion formed at upstream of said ventilator; an intake airflow adjuster for adjusting an air amount introduced from said intake passage to said exhaust passage is provided at said additional diverging portion; and said control unit controls said exhaust airflow adjuster and said intake airflow adjuster such that:

when said garbage disposing device is in the ordinary use mode, said intake airflow adjuster is set to an open position and said exhaust airflow adjuster is set to said first Ion, so that an air sent from said treatment chamber to said exhaust passage is mixed with the air supplied from said intake passage, and when said garbage disposing device is in the regenerating operation mode for said dehumidifying agent, said intake airflow adjuster is set to a close position to close said outlet of said treatment chamber and said exhaust airflow adjuster is set to said second position, so that only the air introduced from said intake passage provided to said exhaust passage.

* * * * *